(12) United States Patent
Morein et al.

(10) Patent No.: US 6,762,758 B2
(45) Date of Patent: Jul. 13, 2004

(54) SYSTEM, METHOD, AND APPARATUS FOR COMPRESSION OF VIDEO DATA USING OFFSET VALUES

(75) Inventors: Stephen L. Morein, Cambridge, MA (US); Mark A. Natale, Leominster, MA (US)

(73) Assignee: ATI Technologies Inc., Ontario (CA)

( * ) Notice: Subject to any disclaimer, the term of this patent is extended or adjusted under 35 U.S.C. 154(b) by 420 days.

(21) Appl. No.: 09/934,697

(22) Filed: Aug. 23, 2001

(65) Prior Publication Data

US 2003/0038803 A1 Feb. 27, 2003

(51) Int. Cl.$^7$ .............................................. G06T 15/00
(52) U.S. Cl. ...................................................... 345/422
(58) Field of Search ................................ 345/421, 422, 345/423; 382/239

(56) References Cited

U.S. PATENT DOCUMENTS

| | | | | |
|---|---|---|---|---|
| 5,808,618 A | * | 9/1998 | Kawano et al. | 345/422 |
| 5,819,017 A | * | 10/1998 | Akeley et al. | 345/422 |
| 6,037,946 A | * | 3/2000 | Takeda | 345/422 |
| 6,104,837 A | * | 8/2000 | Walker | 382/239 |

* cited by examiner

Primary Examiner—Almis R. Jankus
(74) Attorney, Agent, or Firm—Pillsbury Winthrop LLP

(57) ABSTRACT

A system, method, and apparatus for compression of video data is presented. The compressed block includes a plurality of offset values, each indicating an offset between a corresponding one among the plurality of pixel values and a reference value. Exemplary methods are described wherein minimum and maximum reference values are derived from the block of pixel values, and a flag associated with each offset value indicates an appropriate reference value. Application of embodiments of the invention to the transfer of depth (Z) information are discussed.

30 Claims, 26 Drawing Sheets

SYSTEM, METHOD, AND APPARATUS FOR COMPRESSION OF VIDEO DATA USING OFFSET VALUES

BACKGROUND

1. Reservation of Copyright

The disclosure of this patent document contains material that is subject to copyright protection. The copyright owner has no objection to the facsimile reproduction by anyone of the patent document, or the patent disclosure as it appears in the U.S. Patent and Trademark Office patent files or records, but otherwise reserves all copyright rights whatsoever.

2. Field of the Invention

This invention relates to video graphics processing.

3. Description of Related Art

Computers are used in many representational and interactive applications. As computing systems continue to evolve, their graphical display requirements become more stringent. These requirements are especially demanding in the field of three-dimensional (3D) video graphics processing. In 3D images, the positions of the graphics primitives (e.g. elemental polygons) with respect to the display plane include the spatial dimension of depth, also referred to as the Z-dimension. The Z-dimension describes the positioning of a primitive with respect to other objects within a display frame in terms of depth, or distance from the viewer. As such, objects may be drawn in front of or behind one another in overlapping fashion.

Computer displays and other high-resolution display devices, such as high-definition televisions (HDTVs), projectors, printers, and the like, present an image to the viewer as an array of individual picture elements, or pixels. Each pixel has a specific color value that corresponds to the color of the image at the location of the pixel. The pixels are closely spaced, and a viewer's visual system performs a filtering of the individual pixel colors to form a composite image. If an image is properly partitioned into individual pixels, and the pixels are sufficiently close together, the viewer perceives the displayed array of pixels as a virtually continuous image.

In order to present a smooth and continuous image on a display, the entity processing the video graphics images must maintain a high rate of pixel processing. As such, pixel data stored in display memory must be retrieved, processed, and then stored back into the display memory in an efficient manner. A large amount of memory bandwidth is required because as new fragments (e.g. representing color and depth values of new objects) are received, pixels stored in a display frame must be retrieved so that the new information may be incorporated into them to generate an updated image. The resulting set of information for each altered pixel must then be stored back into the display memory.

As the resolution (i.e. the number of pixels in a designated area of the display) increases, the memory bandwidth required to maintain the displayed image also increases. Faster memories or multiple parallel memories may be implemented to meet these increased bandwidth requirements. However, such strategies are more expensive from both design and manufacturing standpoints. Further, precious silicon area is consumed, thus reducing yield and limiting the functionality and performance of graphics chips.

Therefore, what is needed is a method for reducing the memory bandwidth requirements in 3D video graphics systems.

SUMMARY OF THE INVENTION

In a method for data compression according to an embodiment of the present invention, at least one reference value is obtained from a block of input values, along with a set of offset values for each reference value. A compressed block includes the offset values, each of which corresponds to one of the input values and indicates a distance between the input value and the reference value with which the offset value is associated. If more than one reference value is used, the compressed block may also include flags to indicate associations between offset values and corresponding reference values.

DETAILED DESCRIPTION

Figure 1:
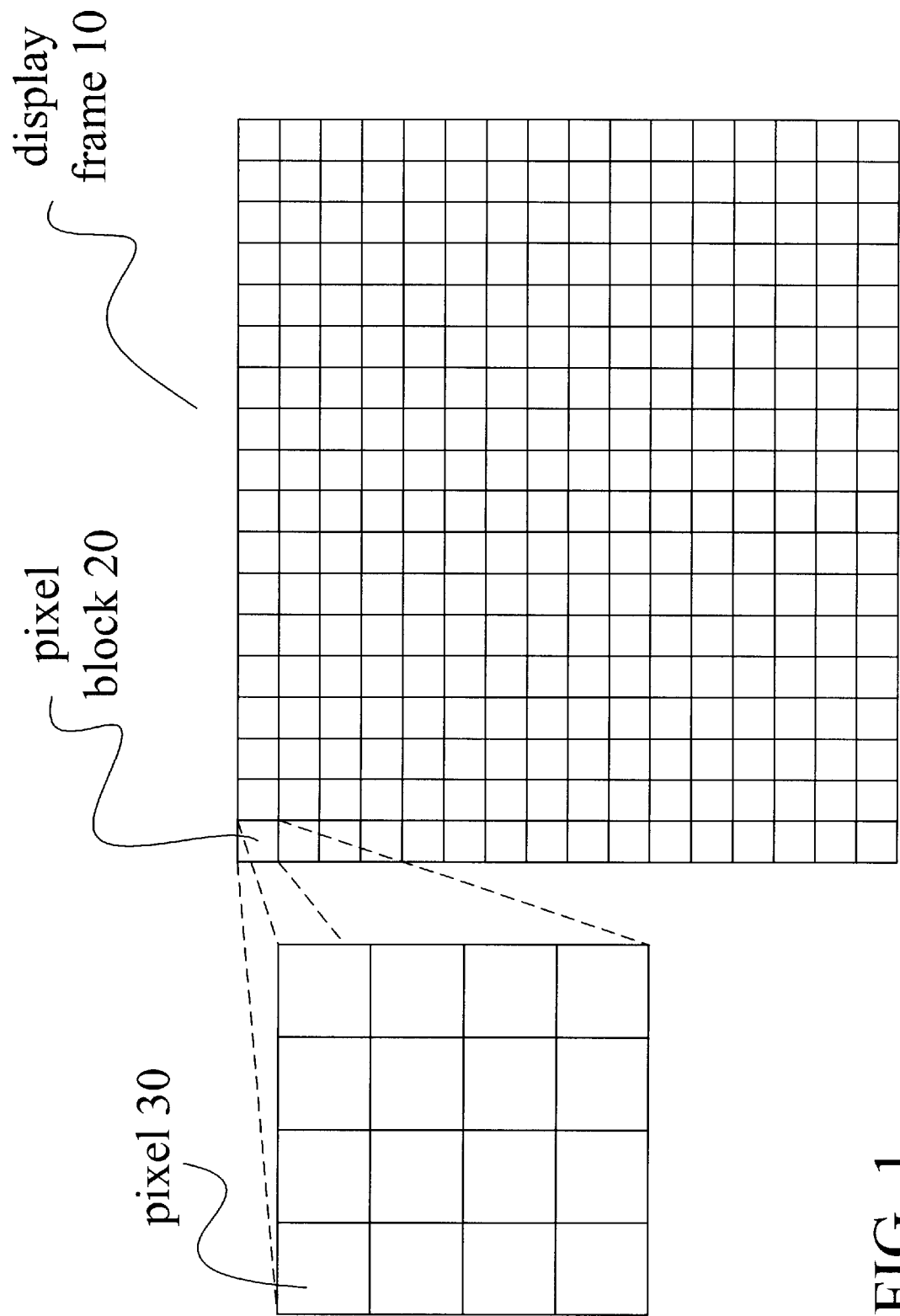
FIG. 1 illustrates a division of a display frame into pixel blocks and pixels.

FIG. 1 shows a display frame 10 that represents a three-dimensional rendering space as viewed from a predetermined viewpoint. For efficient processing, display frame 10 is divided into pixel blocks 20. Although FIG. 1 depicts pixel blocks 20 as square, this division may be performed in any other manner that is efficient with respect to a particular application (e.g. in light of such factors as instruction set architecture, datapath width, and storage or tiling format). For example, blocks that are rectangular and/or interleaved may be used, or blocks of differing shapes and sizes may be distributed throughout a display frame. It may also be desirable to alter the division scheme over time (e.g. from one display frame to another).

Each pixel block 20 includes values that represent a plurality of pixels 30 (i.e. locations where the two-dimensional space of display frame 10 is sampled). For consumer applications, typical sizes for a display frame include 640×480, 800×600, 1024×768, 1152×864, 1280×1024, and 1600×1200 pixels. Each pixel 30 may include one or more pixel values: e.g. a color value, an opacity value (also called an alpha value), and a depth value (also called a Z value, where the display frame is defined as a particular X-Y plane in an XYZ coordinate space). A color value of a pixel may further include multiple subvalues: for example, red, green, and blue values in a RGB colorspace; or hue, saturation, and intensity values in a HSV colorspace.

Figure 2:
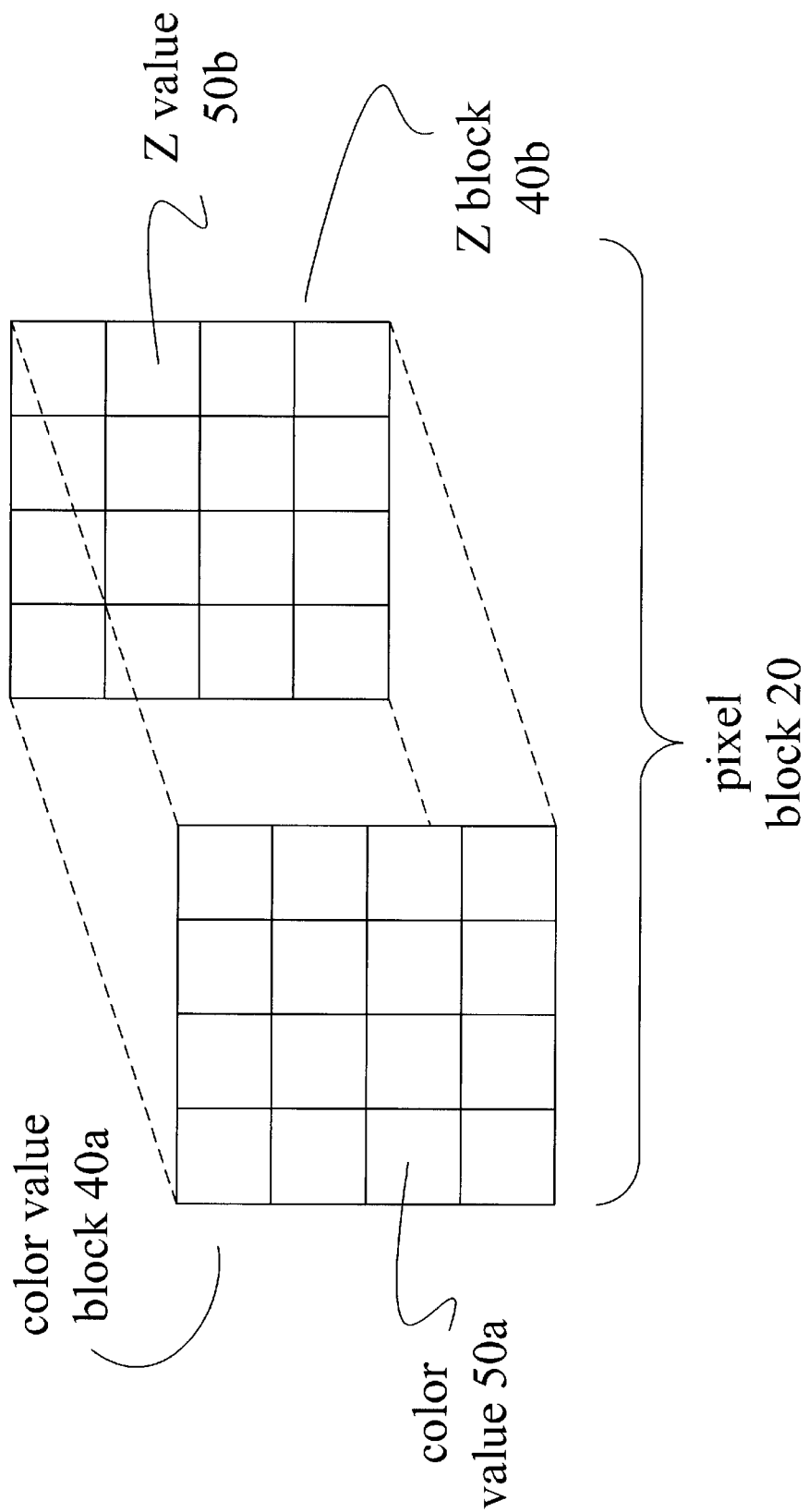
FIG. 2 illustrates a pixel block comprising a color value block of color values and a Z block of Z values.
Figure 3:
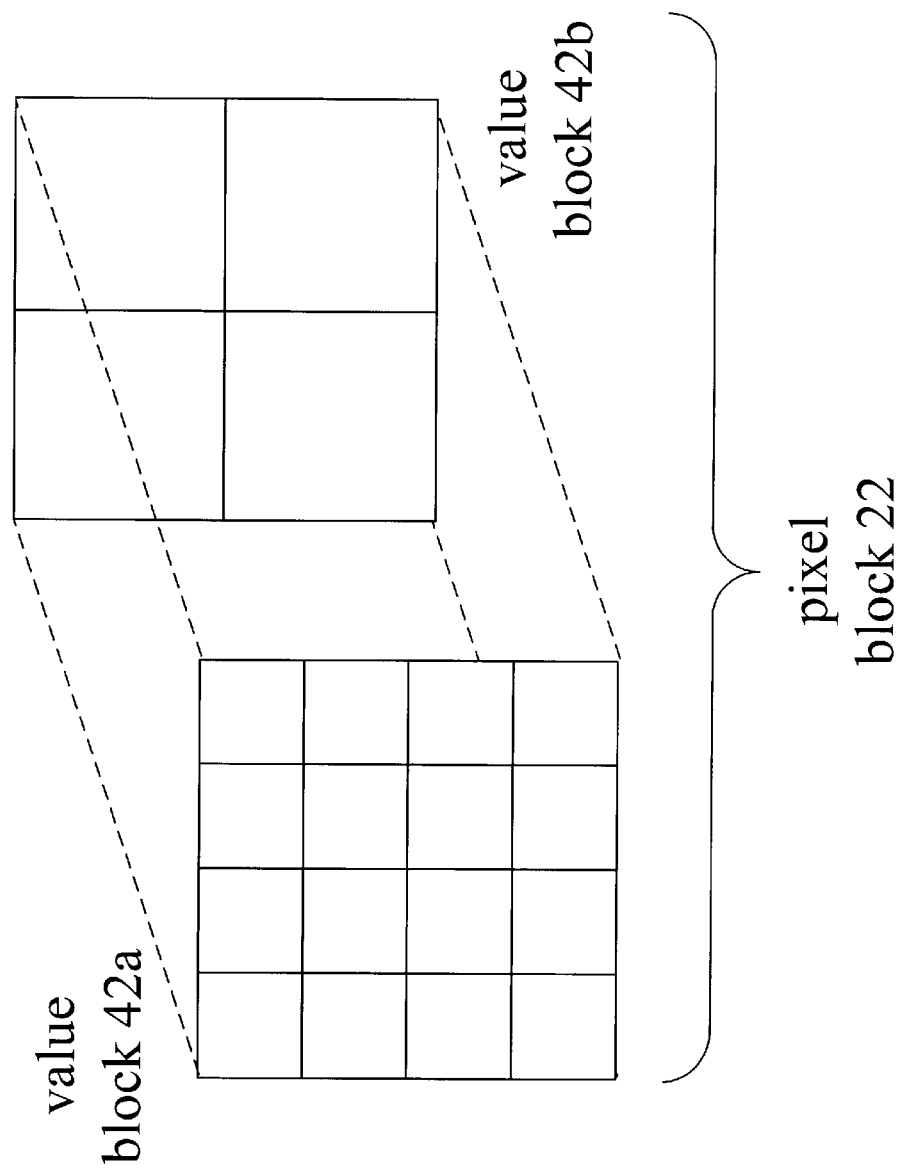
FIG. 3 illustrates a pixel block comprising two value blocks having different numbers of values.

The various values of a pixel may be stored separately and may also be processed separately, e.g. at different stages of the display process. In one example, as discussed herein and as illustrated in FIG. 2, a pixel block 20 includes a color value block 40a and a Z value block (or 'Z block') 40b, with one value 50 in each of blocks 40a and 40b for each pixel 30. However, it is possible for the division of the display frame into pixel values to differ among the various value spaces (for example, the number of values in a color value block and a Z block may differ). It is also possible for the number of values in a display frame to differ depending on the value space. As shown in FIG. 3, for example, a value in a block 42a in one value space (e.g. a Z block) may correspond to more than one value in a block 42b in another value space (e.g. an opacity block).

The number of values 50 in a value block 40 may be selected based on such factors as the size of the display frame in pixels, the width of a datapath (e.g. a memory bus) in the graphics system, or the nature of a compression algorithm employed to compress values. In a system having a 128-bit memory bus and 32-bit Z values 50b, for example, it may be desirable to transfer no less than four Z values [4×32 bits=128 bits] per transaction, so that a Z block 40b may be configured to have a multiple of four values. In FIG. 1, pixel block 20 is shown to contain 4×4 (or 16) pixels, so four memory bus transactions would be required in this system to transfer a Z block 40b associated with pixel block 20 across the memory bus. Many other configurations are possible: for example, a pixel block may contain 8×8 pixels.

Hereinafter, it is assumed that Z values have a length of 32 bits, although the length of Z values may depend upon the architecture employed in a particular graphics system (e.g. 16-bit values may also be used). In a system that includes a stencil buffer, a portion of each Z value may be reserved for use in stenciling operations such as shadow processing (e.g. eight of 32 bits, or one of 16 bits, may be reserved for one or more stencil values). It is also possible for multiple Z values to be stored for each pixel 30 (e.g. in a system that applies oversampling techniques).

Figure 4:
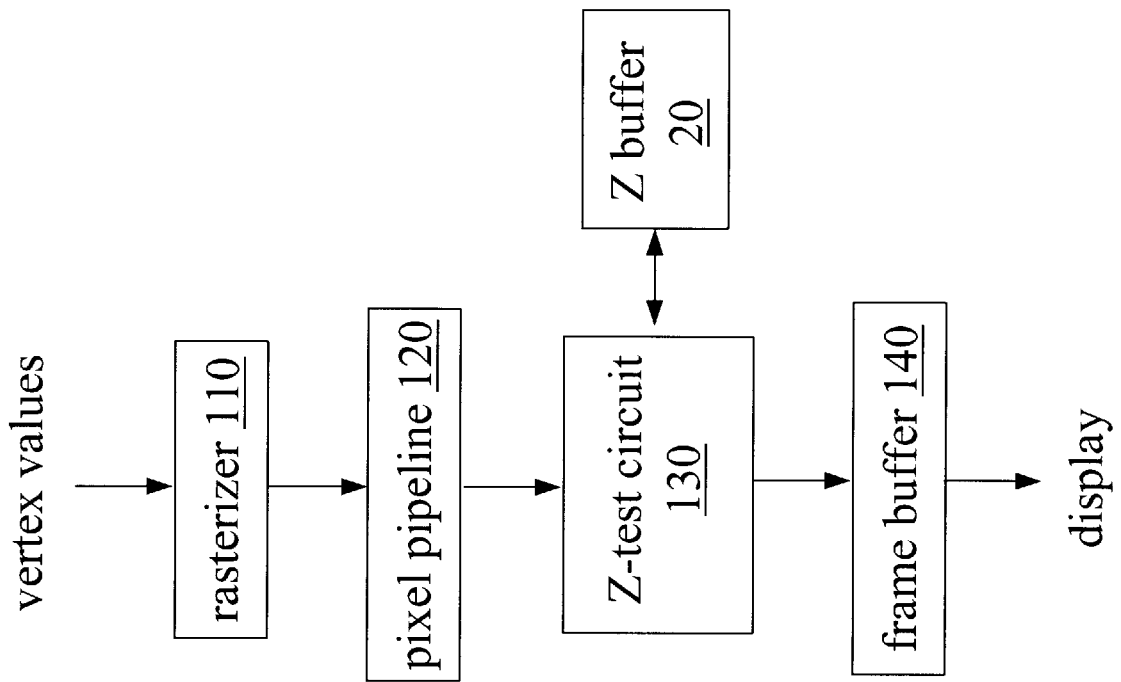
FIG. 4 is a block diagram of a 3D video graphics architecture.

FIG. 4 shows a block diagram for a 3D video graphics architecture. Such an architecture may be implemented in a video graphics card for use in a personal computer. Alternatively, at least a portion of the architecture may be implemented on a chip package that is integrated into a computer mainboard. The objects that make up a scene to be rendered are sent (e.g. by a software application) to a rasterizer 110, which receives each object as a set of graphics primitives (e.g. elemental polygons). In this example, rasterizer 110 receives each primitive (e.g. a triangle) as a set of vertices, where each vertex has a spatial location value (possibly including subvalues such as X, Y, and Z) and one or more other values such as color, opacity, and texture. Rasterizer 110 converts the vertices into fragments, each of which corresponds to a particular pixel of display frame 10 as represented in a frame buffer 140. The fragments are forwarded to pixel pipeline 120, where their color values may be updated by operations such as texture mapping and transparency processing. If the Z value of a fragment passes a Z-test as performed in Z-test circuit 130 (as described below), its color value is stored into the corresponding pixel in frame buffer 140. When frame buffer 140 is completed (i.e. all of the objects to be rendered have been rasterized and incorporated), its contents are modulated onto a display signal (not shown).

The Z value of a pixel indicates its depth within the rendering space. As discussed herein, pixels that are farther away from the viewpoint have higher Z values than pixels that are closer, although other orientations of the Z-axis are also possible. Depth (Z) information is important because an object that is entirely opaque will occlude those portions of other objects that lie behind it with respect to the viewpoint. Because the color values associated with the occluded portions will not be entered into the frame buffer, effort expended in rendering these portions would be wasted. In some cases, processing overhead may be considerably reduced by avoiding operations associated with rendering occluded fragments.

Z-test circuit 130 performs an occlusion test (or 'Z-test') on each fragment. To support this test, a Z buffer 20 is maintained which stores the frontmost Z value for each pixel in the display frame. Z-test circuit 130 compares the Z value of each fragment to the Z value of the corresponding pixel in Z buffer 20. If the fragment is occluded (i.e. the fragment has a Z value greater than the buffered value), then the Z-test fails. In this case, the fragment is not to be added to the frame buffer, the corresponding value in Z buffer 20 is not updated, and the failure may also be reported to other hardware and/or software components for further action. If the fragment has a Z value that is smaller than the buffered value, then the Z-test succeeds. In this case, the fragment may be written to the frame buffer (possibly pending the outcomes of further tests) and the corresponding value in Z buffer 20 is updated with the Z value of the fragment.

Because the Z buffer is typically too large to store locally, blocks of buffered values corresponding to the Z blocks under test must be retrieved from storage (e.g. from system random-access memory or RAM). Because objects are rendered successively, the same block in the Z buffer may be retrieved and tested many times for each rendered frame, and supporting the Z-test may therefore require a great deal of data transfer. If data cannot be transferred from the Z buffer in an efficient manner, the Z-test may become a bottleneck in the rendering process, degrading rendering performance and/or producing results that are untimely and without practical value.

Figure 5:
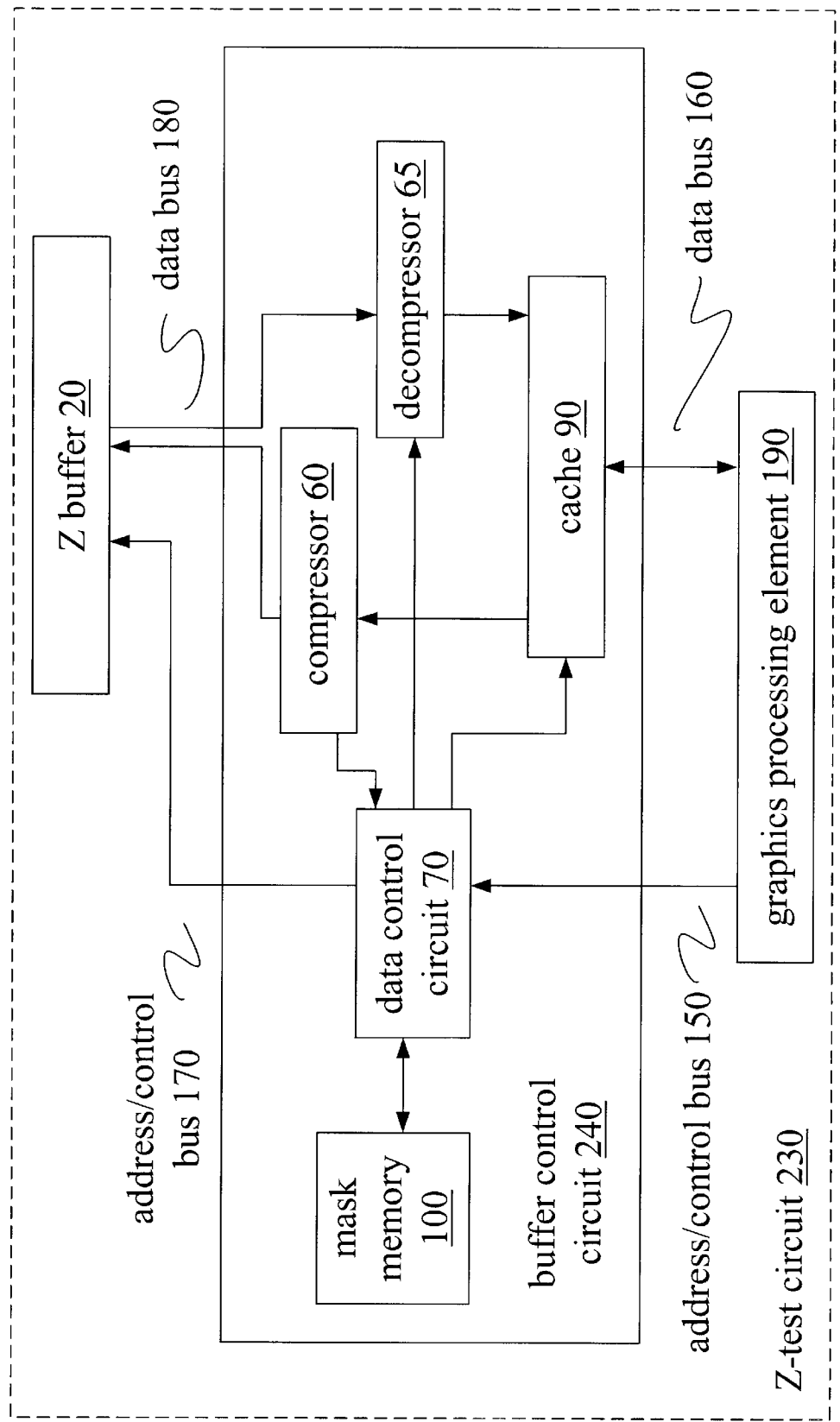
FIG. 5 is a block diagram of a Z-test circuit.

FIG. 5 shows a block diagram of a circuit 230 suitable for use as Z-test circuit 130. Circuit 130 includes a Z buffer 20, a graphics processing element 190, and a buffer control circuit 240. As discussed below, the Z blocks stored by circuit 230 in Z buffer 20 may be either compressed or uncompressed. Although it is possible for graphics processing element 190 to be dedicated to performing the Z-test, it may be more efficient for graphics processing element 190 also to perform some or all of the processing functions in rasterizer 110 and pixel pipeline 120 as well. Buffer control circuit 240 comprises cache 90, mask memory 100, compressor 60, decompressor 65, and data control circuit 70. The tasks of compressor 60, decompressor 65, and data control circuit 70 as described herein may be performed by one or more dedicated arrays of logic elements; in an alternative implementation, graphics processing element 190 or another programmable unit may perform some or all of the tasks of one or more of these elements according to a sequence of instructions.

Z-test circuit 230 may be implemented in a video graphics card for use in a personal computer. Alternatively, Z buffer 20 may reside at least in part in system memory, with the other components of Z-test circuit 230 being implemented in a video graphics card. In one example, graphics processing element 190 and buffer control circuit 240 are implemented in a single chip package integrated on a computer mainboard. In other examples, buffer control circuit 240 may be implemented in a single chip package, or one or more components of circuit 240 (e.g. cache 90) may be implemented off chip.

Figure 6:
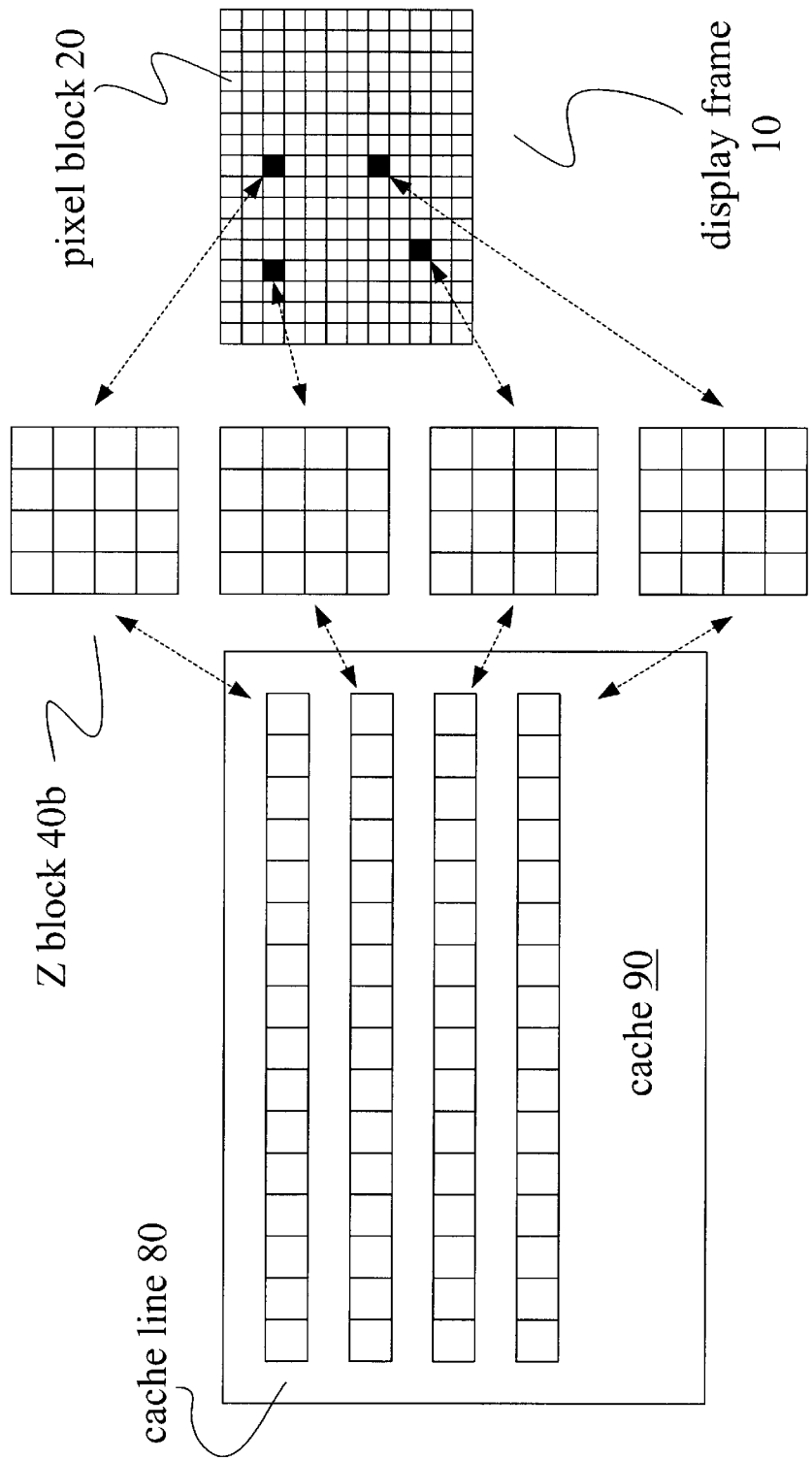
FIG. 6 shows how each line 80 of cache 90 represents a block of Z values.

As shown in FIG. 6, cache 90 contains a number of cache lines 80. Each cache line 80 stores a block of Z values (in uncompressed form) that corresponds to a Z block 40b stored (possibly in compressed form) in Z buffer 20 and associated with a pixel block 20 of display frame 10. Over data bus 170 and through compressor 60 and decompressor 65, cache 90 exchanges blocks of Z values with Z buffer 20. Through data bus 160, cache 90 supplies Z values (e.g. to a graphics processing element 190 that performs the Z-test).

For each of the Z blocks 40b buffered in Z buffer 20, mask memory 100 stores a binary mask value (i.e. a flag) which indicates whether the block is stored in Z buffer 20 in compressed or uncompressed form. In a scheme that supports different levels or types of compression, mask memory 100 may store an n-bit or multi-valued mask value of sufficient length to distinguish among the various compression options available.

From cache 90, compressor 60 receives blocks of Z values to be stored in Z buffer 20. Compressor 60 compresses each block if possible, indicates the compression status to cache control circuit 70 (i.e. for storage in mask memory 100), and forwards the compressed or uncompressed block to Z buffer 20 for storage. Decompressor 65 receives blocks of Z values and the corresponding mask values (from Z buffer 20 and cache control circuit 70, respectively), decompresses the blocks if necessary, and forwards the uncompressed blocks to cache 90 for storage.

Over address/control bus 150, cache control circuit 70 receives commands (e.g. from graphics processing element 190) to transmit or receive Z values corresponding to specified pixels or pixel blocks. If a cache hit is detected (i.e. if the corresponding cache line is present in cache 90), cache control circuit 70 causes cache 90 to transmit or receive Z values over data bus 160 in accordance with the request. If a cache miss is detected, cache control circuit 70 causes cache 90 to write back a particular cache line to Z buffer 20 (via compressor 60 and according to a predetermined cache replacement policy), to receive the cache line from Z buffer 20 (via decompressor 65) that corresponds to the request, and to transmit or receive Z values over data bus 160 in accordance with the request.

Buffer control circuit 240 may also include a clear register as described in the copending U.S. patent application Ser. No. 09/369,730, entitled "METHOD AND APPARATUS FOR CONTROLLING COMPRESSED Z INFORMATION IN A VIDEO GRAPHICS SYSTEM," filed Aug. 6, 1999, and assigned to the assignee of the present application. Additionally, upon a cache miss, the largest (i.e. backmost) Z value among a cache line block marked for replacement may be copied as a representative Z value for the block into a representative Z value memory (or 'hierarchical Z buffer') as described in copending U.S. patent application Ser. No. 09/140,930, entitled "METHOD AND APPARATUS FOR PROCESSING OBJECT ELEMENTS THAT ARE BEING RENDERED," filed Aug. 27, 1998, and assigned to the assignee of the present application.

Figure 7:
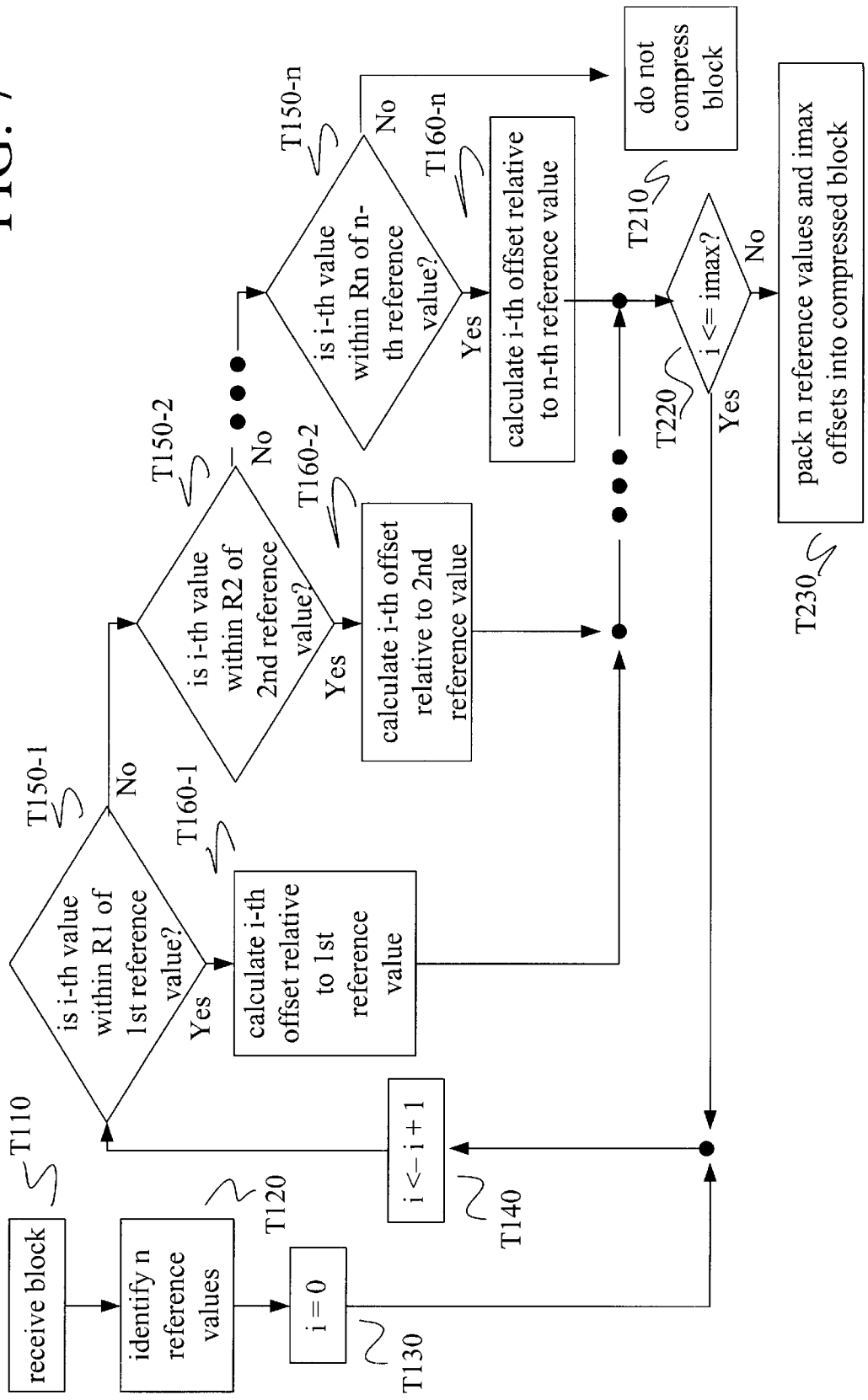
FIG. 7 is a flow chart of a method according to an embodiment of the invention.

FIG. 7 shows a flow chart for a method for data compression according to an embodiment of the invention. In task T110, a block of input values (e.g. Z values) is received. A predetermined number n of reference values among the input values are found in task T120. A counter is initialized in task T130 and incremented by 1 in task T140. Test task T150-1 determines whether the i-th input value is within a predetermined range R1 of the first reference value. If the test succeeds, then task T160-1 calculates the offset of the i-th input value relative to the first reference value (e.g. by subtracting one of the two values from the other). If the test fails (i.e. the i-th input value is not within R1 of the first reference value), then test tasks T150-2 through T150-n are successively performed until the i-th input value is determined to be within a predetermined range Rj of the j-th reference value (where j is incremented from 2 through n). If the j-th test succeeds, then task T160-j calculates the offset of the i-th input value relative to the j-th reference value and the loop condition is tested in task T220. Depending on the outcome of task T220, either task T140 selects the next input value or task T230 packs the reference values and offsets into a compressed block. If all of the tests in tasks T150-1 through T150-n fail, then task T210 indicates that the block is not compressed. Loop maintenance constructions other than the one shown (i.e. comprising tasks T130, T140, and T220) are also possible. Additionally, two or more among test tasks T150-1–T150-n (and/or corresponding calculation tasks T160-1–T160n) may be performed in parallel (e.g. using a parallel implementation in hardware).

Figure 7A:
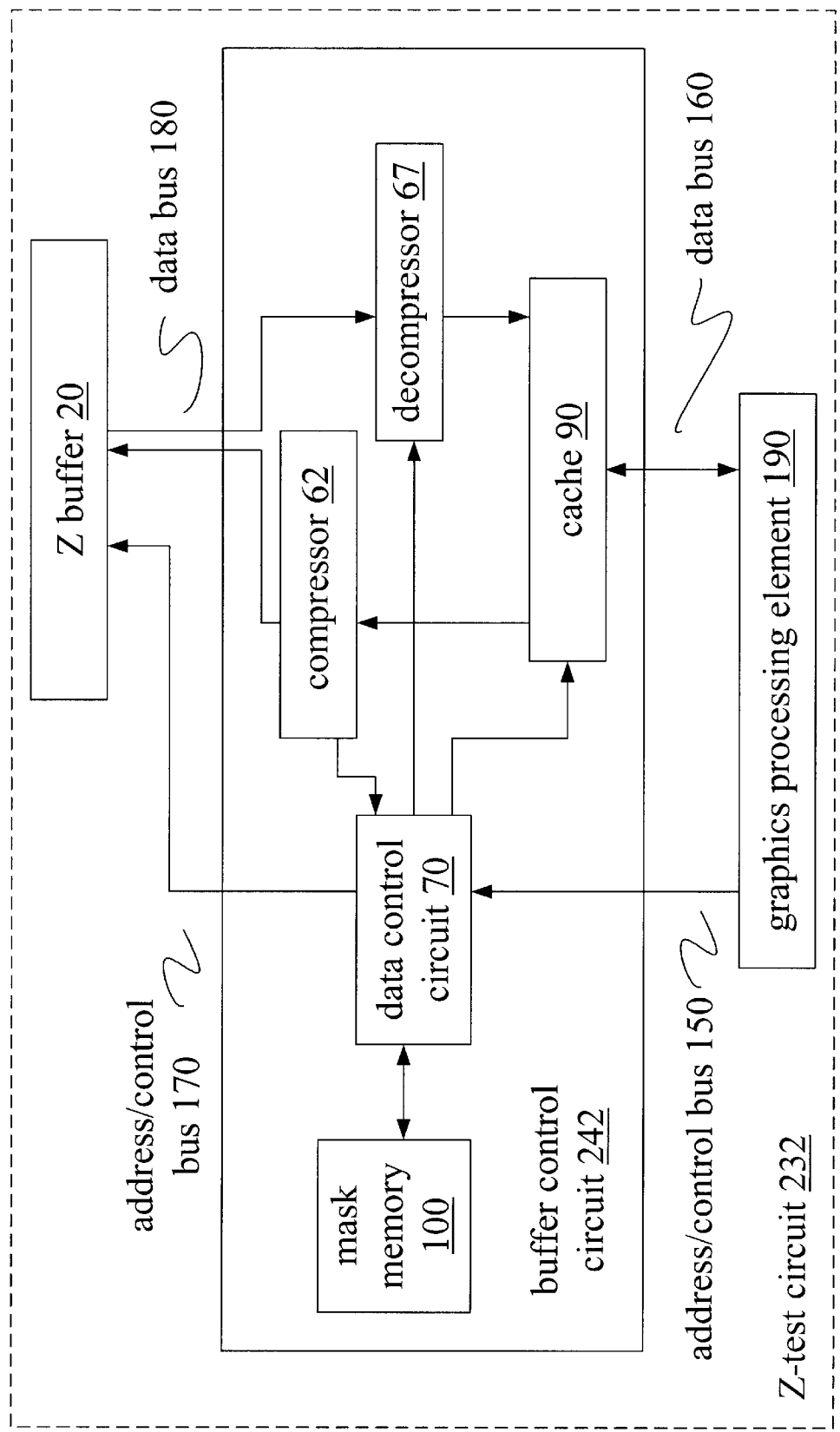
FIG. 7A is a block diagram of a Z-test circuit according to an embodiment of the invention.

FIG. 7A shows a block diagram for a Z-test circuit 232 having a buffer control circuit 242 that includes a compressor 62 and a decompressor 67 according to an embodiment of the invention. Compressor 62 compresses blocks of Z values in accordance with a method as shown in FIG. 7 (e.g. when a cache line is to be written back to Z buffer 20), while decompressor 67 decompresses blocks as indicated by mask memory 100. In one implementation, compressor 62 and/or decompressor 67 is included in an application-specific integrated circuit (ASIC) or other array of logic elements, although in another implementation graphics processing element 190 or another programmable unit may perform the tasks of these circuit elements.

Figure 8:
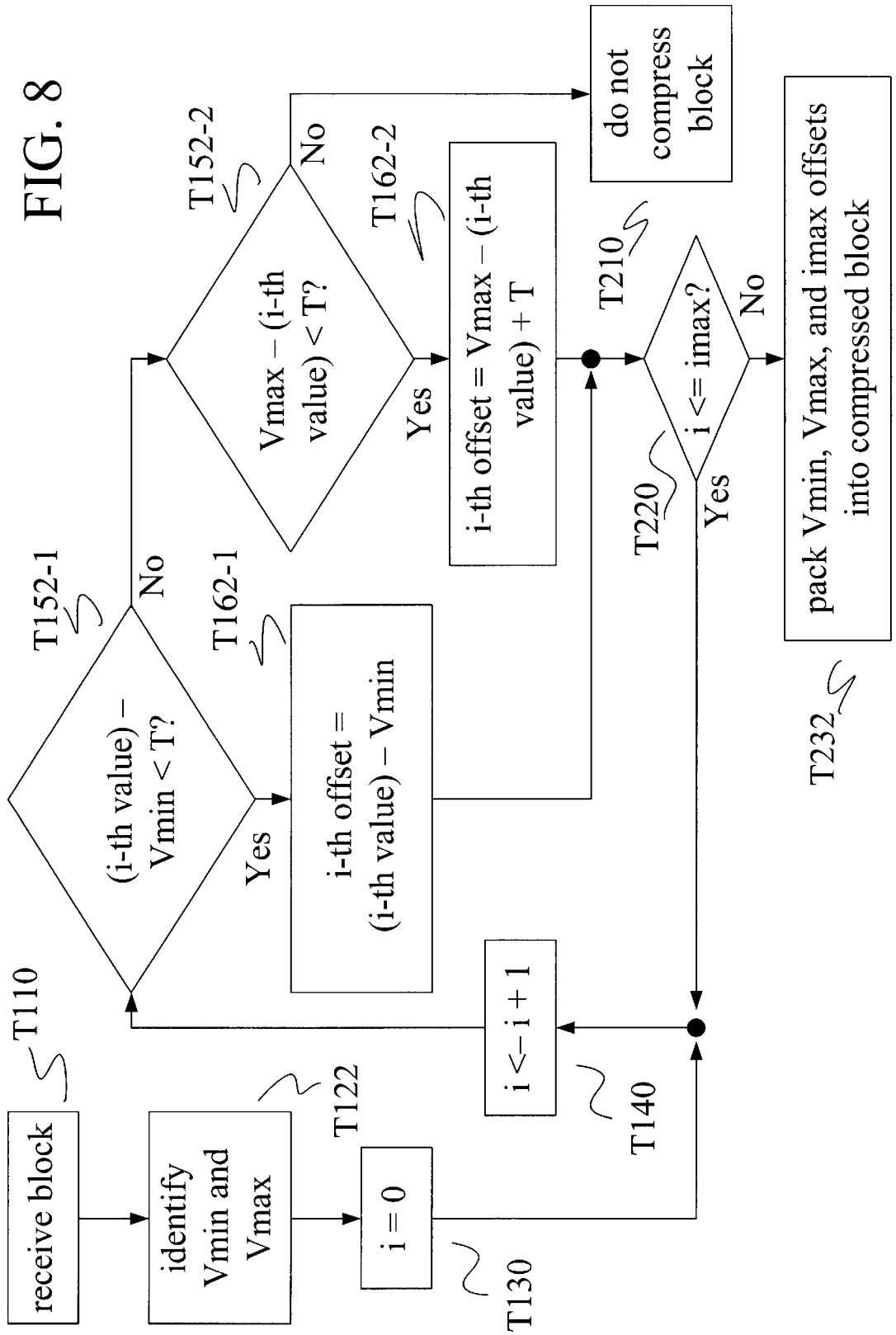
FIG. 8 is a flow chart of a particular implementation of the method shown in FIG. 7.

FIG. 8 shows a flow chart for a method according to a particular implementation of the method shown in FIG. 7. In this method, task T122 identifies two reference values: the minimum among the input values (denoted as Vmin) and the maximum among the input values (denoted as Vmax). Task T152-1 determines whether the i-th input value is within a predetermined range (denoted as T) of Vmin. If the test succeeds, task T162-1 calculates the i-th offset as the difference between the i-th input value and Vmin. If test task T152-1 fails, then task T152-2 determines whether the i-th input value is within a predetermined range (denoted as T) of Vmax. If the test succeeds, task T162-2 calculates the i-th offset as the difference between Vmax and the i-th input value. If both tests T152-1 and T152-2 fail, then task T210 indicates that the block is not compressed.

In the example of FIG. 8, offsets relative to Vmax are distinguished from offsets relative to Vmin by adding T to the offset values calculated in task T162-2. Because the maximum offset from Vmin may not exceed T, any offset value larger than T is recognized upon decompression as indicating an offset relative to Vmax. As described herein, the value T is a power of 2 and may be expressed as $T=2^a$. Therefore, adding T to an a-bit offset value represented as a binary number is equivalent to setting a binary flag appended to the left (i.e. most significant) side of the offset value. In a particular implementation, the input values are 32-bit Z values and the value of T is 2048 ($2^{11}$). In other implementations of a method as shown in FIG. 8, the value T need not be a power of 2 and/or an offset value may be associated with Vmin or Vmax according to its arithmetic sign.

Figure 9:
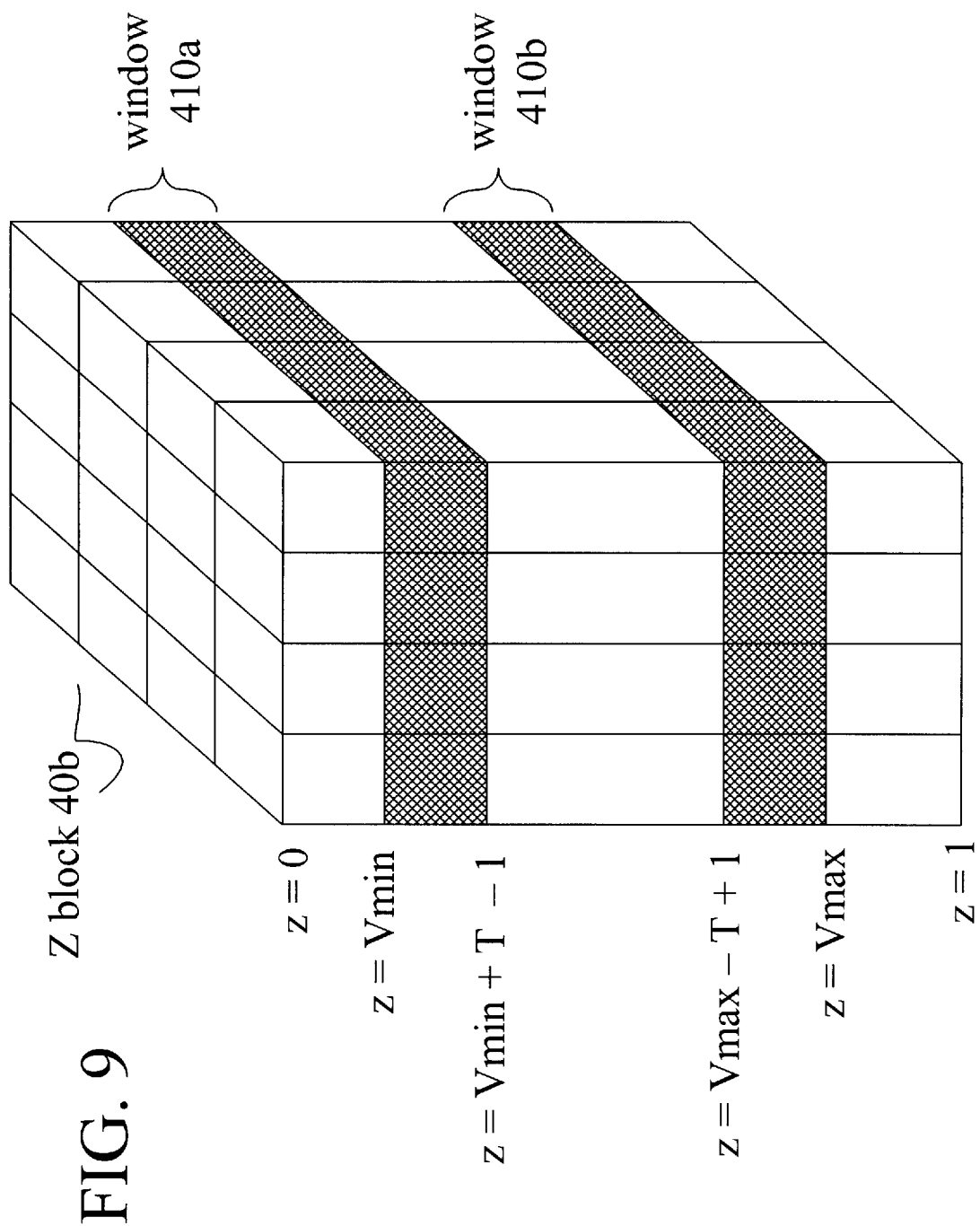
FIG. 9 shows a 3D representation of a block of Z values.

FIG. 9 shows a three-dimensional view of the application of a method as shown in FIG. 8 to a Z block 40b, where the Z-axis extends from top to bottom as labeled. For ease of illustration, the Z-axis as described herein is normalized to extend from z=0 (i.e. the viewing plane) to z=1. In an actual implementation using 32-bit Z values, the number zero may be used to represent a normalized Z value of zero, while the number ($2^{32}-1$) may be used to represent a normalized Z value of one.

As shown in FIG. 9, a window 410a is defined by the reference value Vmin and the value (Vmin+T-1), and another window 410b is defined by the reference value Vmax and the value (Vmax-T+1). A block having Z values that fall within either of these windows may be compressed by being encoded as offsets from the corresponding reference values, while a block having a Z value that falls outside both windows will be identified (i.e. in task T210) as not compressed.

Figure 10:
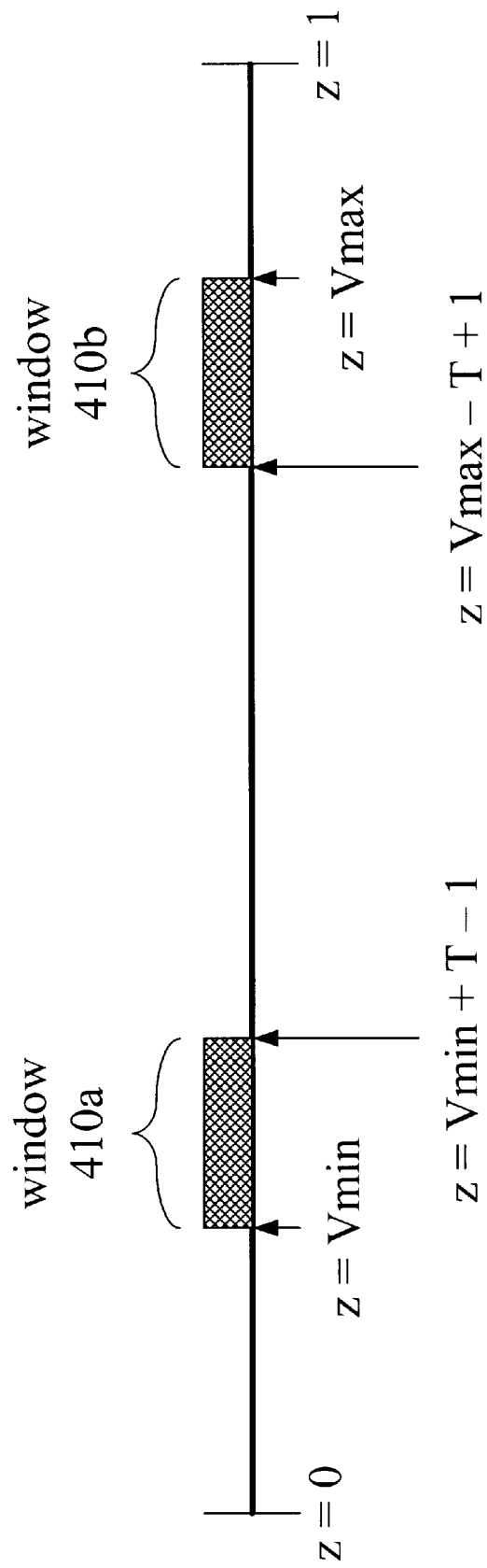
FIG. 10 shows a linear representation of the Z-axis shown in FIG. 9 with sliding windows as associated with a method as shown in FIG. 8.

FIG. 10 shows a linear view of FIG. 9. Because the placements of windows 410a and 410b along the Z-axis depend only on the particular values of Vmin and Vmax, each of which may each represent any normalized value between z=0 and z=1, one may view the operation of this method as applying 'sliding windows'. Z values that fall within window 410a are encoded as offsets relative to Vmin, while Z values that fall within window 410b are encoded as offsets relative to Vmax. In a case where windows 410a and 410b overlap, Z values in the overlapping region may be encoded as offsets relative to either Vmin or Vmax.

Range value T determines the widths of both windows 410a and 410b. In other embodiments, different and unequal range values may be used for each window. In one example, an object having a surface with acute Z angles is rendered against a background that has a relatively small slope with respect to the viewing plane. In this case, it may be desirable to allocate fewer bits to the backmost window (i.e. the window corresponding to the background) and more to the frontmost window (i.e. the window corresponding to the background). Consequently, a compression method for this case may use a larger range value for the frontmost window and a smaller one for the backmost window.

Figure 11:
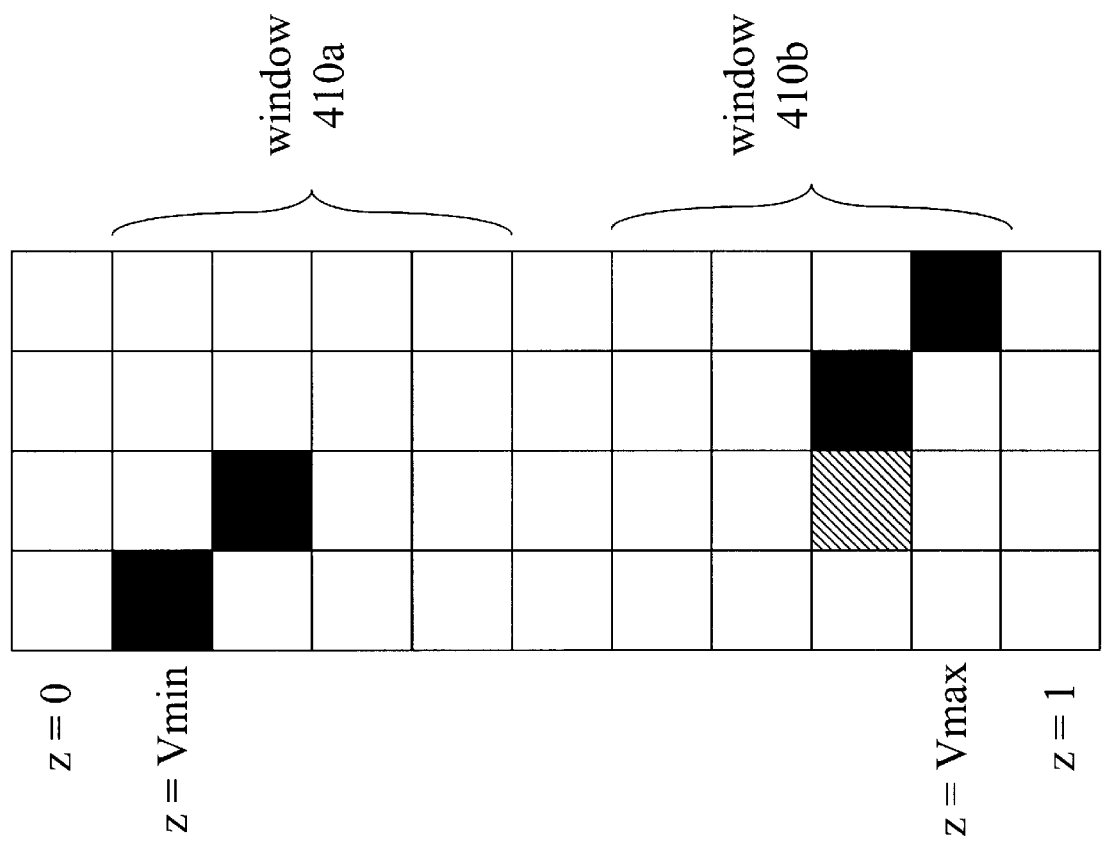
FIG. 11 shows a two-dimensional representation of a block as shown in FIG. 9.
Figure 12:
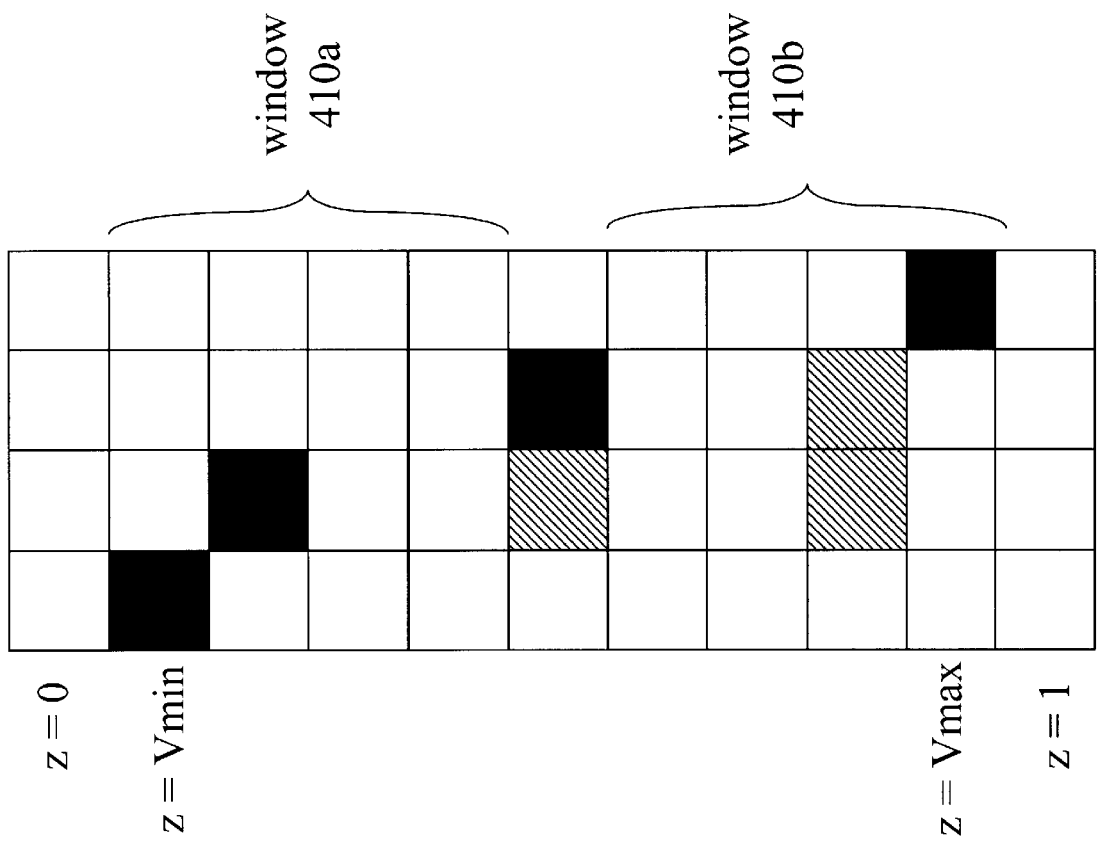
FIG. 12 shows another two-dimensional representation of a block as shown in FIG. 9.
Figure 13:
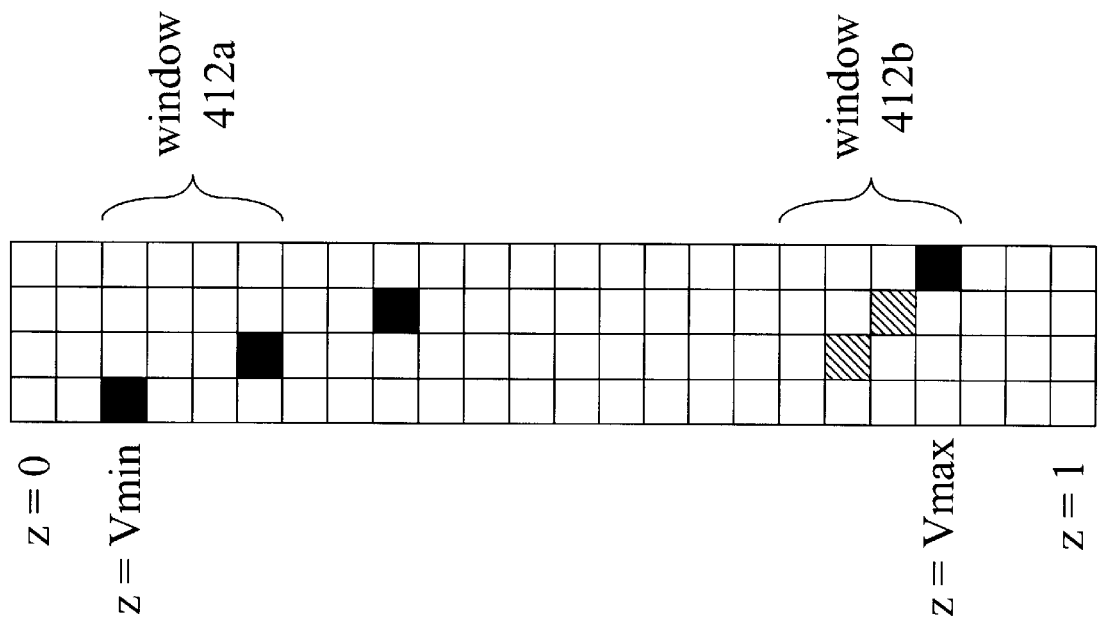
FIG. 13 shows another two-dimensional representation of a block as shown in FIG. 9.

FIGS. 11 through 13 show pixel planes of selected Z block examples. In these examples, a fully shaded block indicates a Z value that is currently stored in the Z block (i.e. a frontmost Z value). A hatched block indicates a Z value that is not currently stored in the Z block (i.e. an occluded Z value); such a value may never have been stored because it failed a Z test, or it may have been stored but was overwritten in the block by an occluding value. As more objects are rendered in a frame, the contents of a Z block may change, and consequently the compressibility of the block under any particular scheme as described herein may change as well (possibly several times during the rendering of the frame). In other words, depending on the nature of subsequently rendered objects, a Z block that was not compressible at one time may become compressible at a later time, and vice versa.

FIG. 11 shows a particular pixel plane (along the Z direction and either of the X or Y directions) of a Z block 40b being processed as shown in FIG. 9. In this example, the range value T is equal to 4 (i.e. a=2), one object lies entirely within the illustrated portion of window 410a, and another object lies entirely within the illustrated portion of window 410b. The hatched block indicates a Z value of the back object that is occluded by a Z value of the front object. Assuming that the two objects lie within either window at all of the other X and Y positions in the block, this block may be compressed.

Figure 11A:
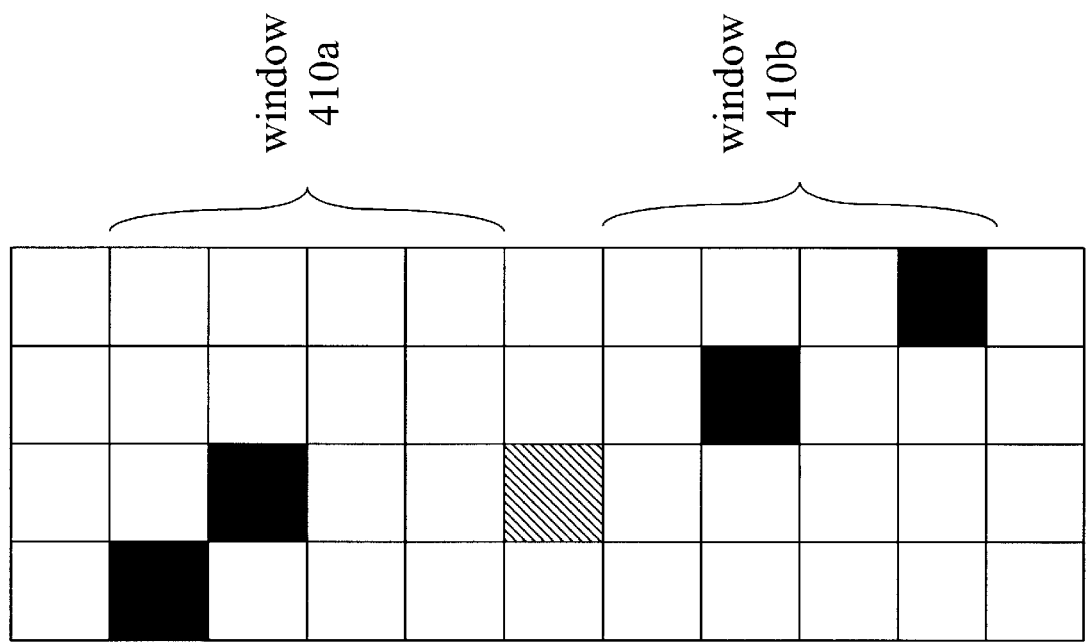
FIG. 11A shows another two-dimensional representation of a block as shown in FIG. 9.

FIG. 11A shows another example of a block that may be compressed by a method as shown in FIG. 8. Although the back object includes a value that lies outside the range of either window, this value is occluded. All unoccluded values in this example lie within one of the two windows, and assuming that the two objects lie within either window at all of the other X and Y positions in the block, this block may be compressed.

FIG. 12 shows an example of a pixel plane in a block that is indicated as not compressed by a method as shown in FIG. 8. In this example, the range value of T is again equal to 4 (a=2), and a third object lies between windows 410a and 410b. (The hatched blocks again indicate occluded Z values.) No offset between either reference value and the unoccluded Z value of the third object is less than T. Therefore, because one or more unoccluded Z values of block 40b do not fall within either window 410a or 410b, not all values of the Z block can be expressed as 2-bit (i.e. a-bit) offset values and the block is not compressed.

As shown in FIG. 12, compression may fail when a third object occurs within the block. As the number of input values in the block increases, the probability that a higher number of objects will occur within the block also increases, and the likelihood that the block may be compressed may decrease. As shown in FIG. 13, however, even a block that contains only two objects (or only one object) may not be compressed. In this example, where the range value of T is again equal to 4 (a=2), the frontmost object has a very large slope in the Z-dimension that extends beyond window 412a. Because the unoccluded values in the block cannot be encompassed by two windows of width 2a, the block is not compressed.

As noted above, a method of data compression according to an embodiment of the invention compresses an input value of a block by encoding it as an offset relative to a reference value. Such a method may be used to represent a block of values losslessly using significantly fewer bits than without compression. Let the number of input values in a block be denoted by V, the length of each input value (in bits) be denoted by H, and the length in bits of a compressed value (including both the offset value and the corresponding flag) be denoted by P=(a+1). Then the savings in bits that is achieved by compressing a block according to a method as shown in FIG. 8 may be expressed as V(H−P)−2H. In the case where the uncompressed block has 16 32-bit Z values, V=16 and H=32 for a total of 512 bits (or four memory transactions in a system using a 128-bit-wide memory bus). By compressing these 32-bit Z values into 12-bit compressed values (11-bit offset values and one-bit corresponding mask values), the savings in bits may be expressed as 16(32−12)−2(32) or 256 bits (i.e. two memory bus transactions). Therefore, a 100 percent increase in transfer rate may be achieved. At the cost of additional compression and decompression logic, further savings may be realized by storing only an indication of which input values correspond to Vmin and Vmax, rather than storing P-bit compressed values of zero for each of these two numbers.

Pseudocode for performing packing task T232 according to one example follows. In this example, the reference values Vmin and Vmax and 16 12-bit compressed values CV0–CV15 (each comprising an 11-bit offset value and a one-bit flag) are packed into a compressed block of eight 32-bit values out0–out8 that represents a block of 16 32-bit Z values:

out0=Vmax;
out1=Vmin;
out2=CV0|CV1<<12|((CV2 & 0xFF)<<24);
out3=(CV2>>8)|(CV3<<4)|(CV4<<16)|(CV5 & 0xF)<<28);
out4=(CV5>>4)|(CV6<<8)|(CV7<<20);
out5=CV8|(CV9<<12)|((CV10 & 0xFF)<<24);
out6=(CV10>>8)|(CV11<<4)|(CV12<<16)|(CV13 & 0xF)<<28);
out7=(CV13>>4)|(CV14<<8)|(CV15<<20);

In this example, the symbols >>, <<, &, and | indicate the bitwise operations right logical shift, left logical shift, logical AND, and concatenation, while the prefix 0x indicates a number expressed in hexadecimal notation.

Figure 14:
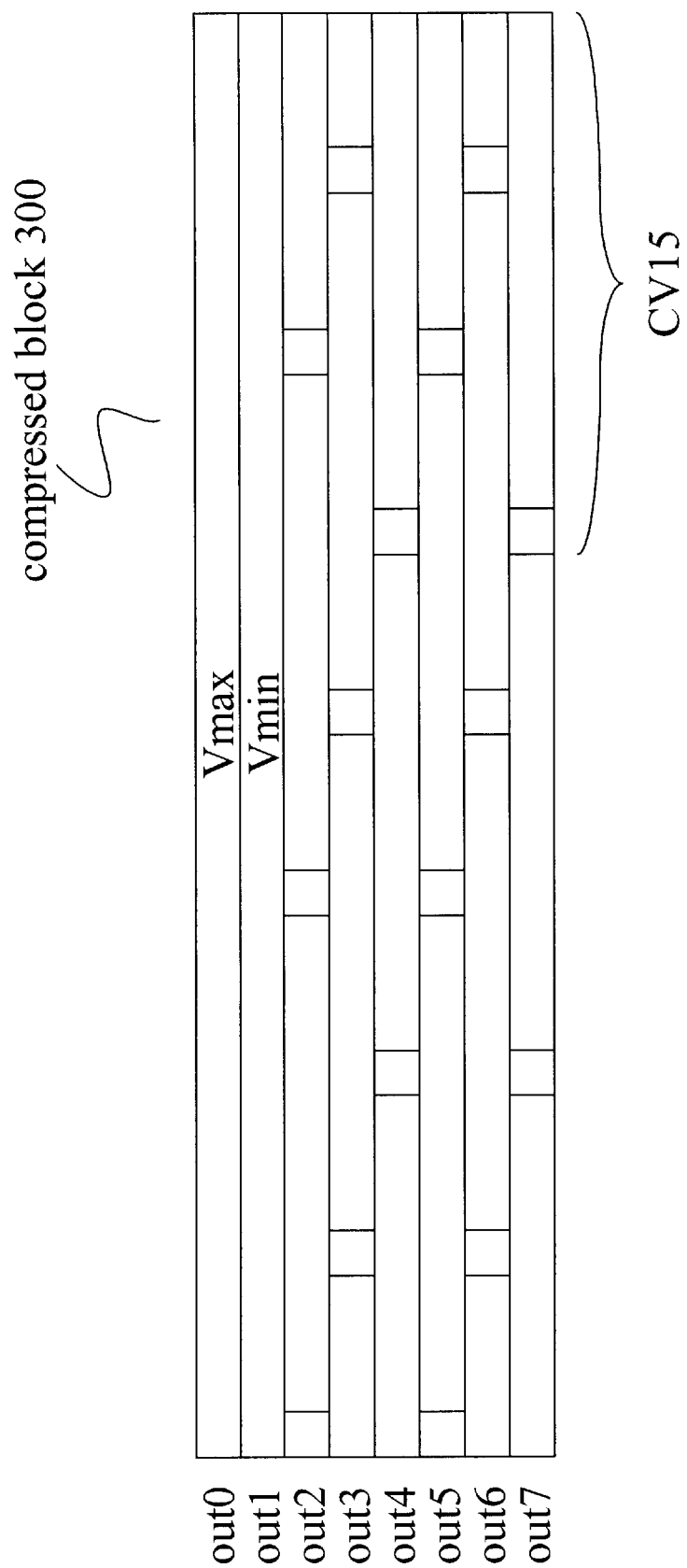
FIG. 14 shows a block of data compressed according to a method as shown in FIG. 8.

FIG. 14 depicts a compressed block 300 as outputted by task T232 according to the source code example above. In this example, each of the 32-bit output values out0–out7 is labeled. A separation between the one-bit flags and corresponding offset values is illustrated, although for legibility only Vmax, Vmin, and the compressed value CV15 are explicitly labeled.

Figure 14A:
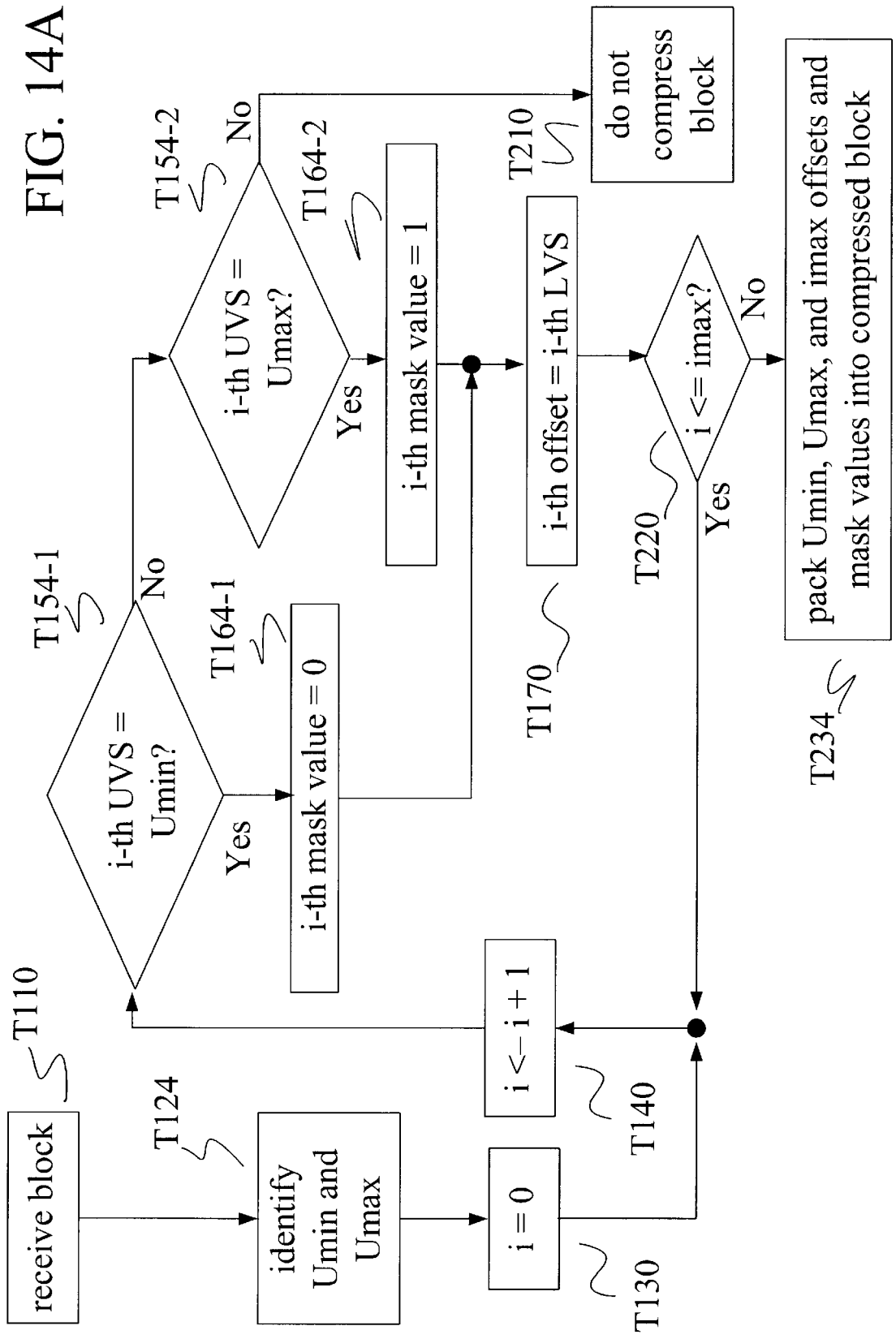
FIG. 14A is a flow chart of a method according to an embodiment of the invention.

In a method according to another embodiment of the invention as shown in FIG. 14A, each input value of a block is divided into an upper value segment and a lower value segment. Denoting the length (e.g. in bits) of each input value as H and the length of the lower value segment (LVS) as a, the length of the upper value segment (UVS) may be expressed as (H−a). In one example, each 32-bit Z value is divided into a 21-bit upper value segment and an 11-bit lower value segment. Task T124 identifies two reference values: the minimum and maximum UVSs for the block (Umin and Umax, respectively). Each Z value whose UVS equals either Umin or Umax is encoded by storing the LVS of the Z value as the offset value, together with a corresponding mask value that indicates Umin or Umax as appropriate. If the UVS of any Z value in a block does not match one of the two reference values, task T210 indicates that the block is not compressed.

In this method, arithmetic operations are not required to compute offsets relative to Umin or Umax. Additionally, a block compressed in this fashion may be decompressed simply by concatenating each offset value with Umin or Umax as indicated by the flag (or, equivalently, left logical shifting Umin and Umax by a bits and masking each offset value into the corresponding resulting zero-valued LVS). Therefore, a considerable reduction in processing and/or hardware complexity may be obtained by applying such a method.

Figure 15:
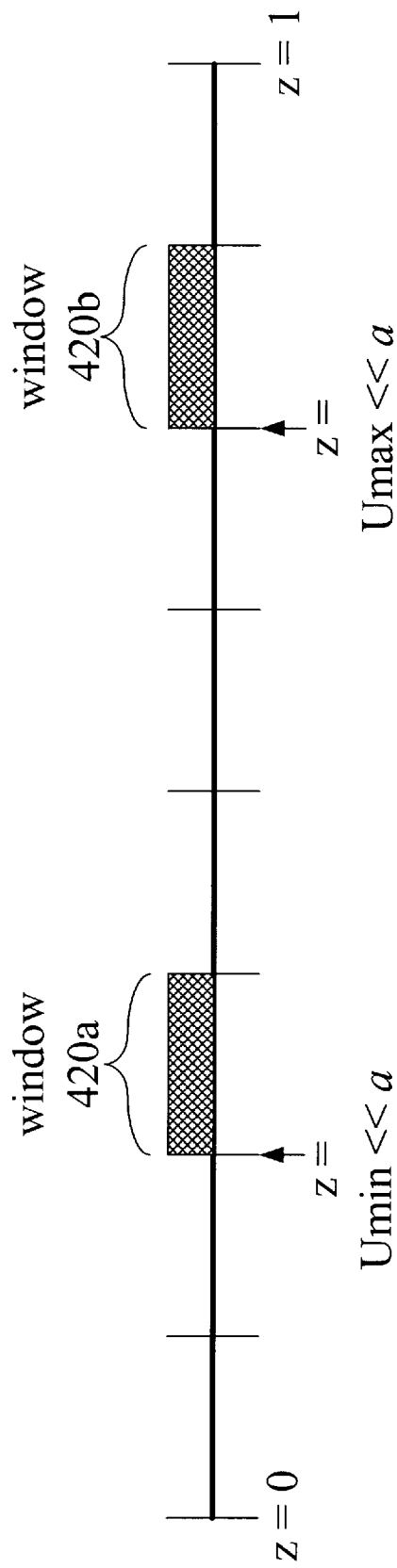
FIGS. 15 and 16 show a linear representation of the Z-axis shown in FIG. 9 with fixed windows as associated with a method as shown in FIG. 14A.

FIG. 15 shows a linear view of windows 420a and 420b in accordance with this method. Each window has a width of 2a. Because the lower bounds of windows 420a and 420b (Umin<<a and Umax<<a, respectively, with the symbol << indicating the operation 'left logical shift') will always be multiples of 2a, one may view the operation of this method as applying 'fixed windows.' The possible lower bounds of these windows are represented as tick marks in FIG. 15.

Figure 16:
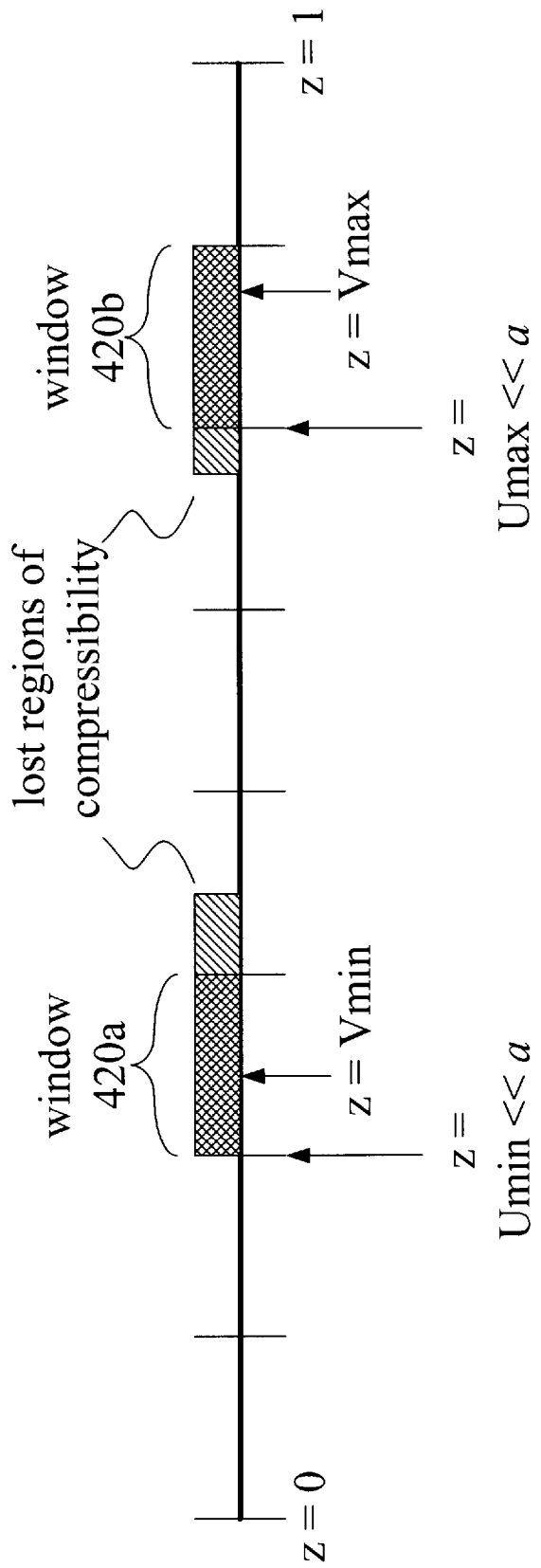

As demonstrated in FIG. 16, a method as shown in FIG. 14A may fail to compress blocks that would be compressed under a method as shown in FIG. 8. In FIG. 16, the cross-hatched areas indicate windows 420a and 420b, whose respective lower bounds are (Umin<<a) and (Umax<<a). The actual minimum and maximum input values in the block are indicated as Vmin and Vmax, and one may recognize that any area of window 420a that lies below Vmin, and any area of window 420b that lies above Vmax, will not include any input values. Under a method as shown in FIG. 8, the windows would extend into the single-hatched regions, and a block having input values lying only within these regions would be compressed. Under a method as shown in FIG. 14A, however, the block will not be compressed if any input values lie within these single-hatched regions.

Figure 17:
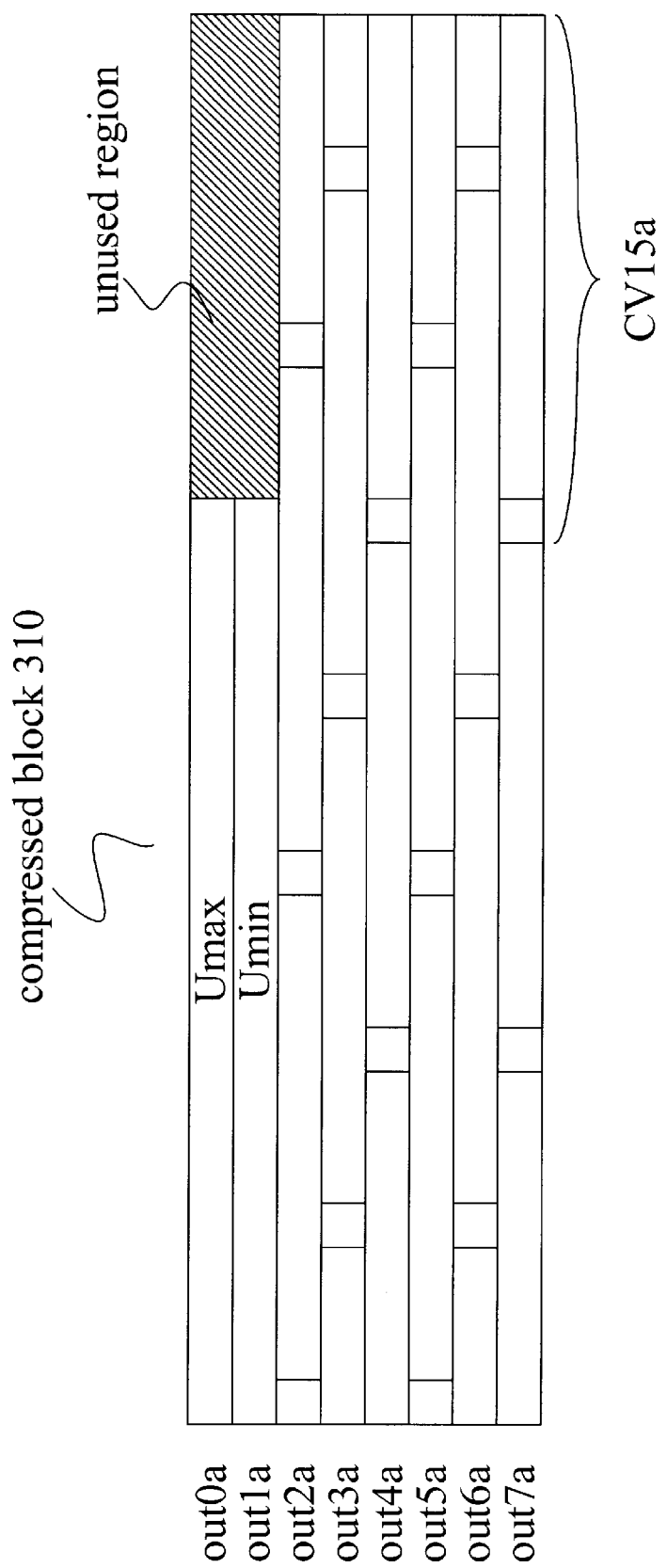
FIG. 17 shows a block of data compressed according to a method as shown in FIG. 14A.

FIG. 17 depicts a compressed block 310 as may be outputted by task T234, where H=32 and a=11. In this example, each of the 32-bit output values out0a–out7a is labeled. The compressed block includes the (H−a)-bit (or 21-bit) values Umin and Umax. The compressed block also includes 16 a-bit (or 11-bit) offset values corresponding to each of the Z values of the input block, each offset value being the lower value segment of the associated Z value. The compressed block further includes a one-bit flag for each of the offset values to indicate whether the offset value is associated with Umin or Umax. A separation between the one-bit flags and corresponding 11-bit offset values is illustrated, although for legibility only Umax, Umin, and the 12-bit compressed value CV15a are explicitly labeled. Under this method, a transfer rate increase of over 100 percent is achieved, as compressed block 310 includes a 22-bit unused region (shown as the hatched region in FIG. 17).

Figure 18:
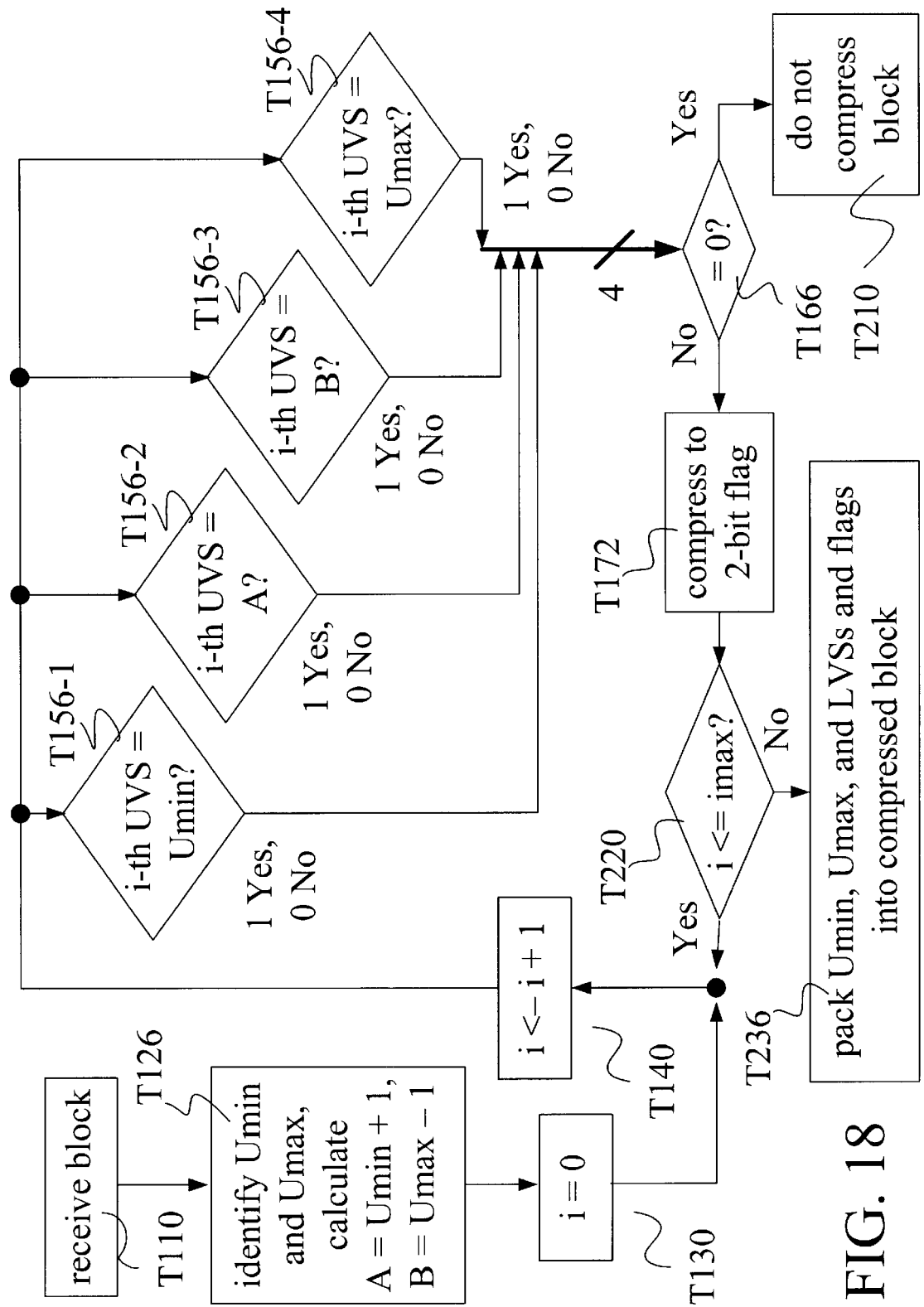
FIG. 18 is a flow chart of a method according to an embodiment of the invention.

FIG. 18 shows a flow chart for a method according to a further embodiment of the invention. In this method, input values of a block are divided into upper value segments and lower value segments as described above, and in task T126 the minimum upper value segment Umin and the maximum upper value segment Umax are identified. Two additional reference values are also calculated in task T126: an auxiliary minimum upper value segment A (obtained by adding one to Umin) and an auxiliary maximum lower value segment B (obtained by subtracting one from Umax). For each input value in the block, the UVS is compared to Umin, A, B, and Umax in tasks T156-1–T156-4, respectively, to obtain a four-bit compression result. Each bit of the compression result corresponds to one of the reference values, and a bit is set to indicate that the UVS of the input value is equal to the reference value. If test task T166 determines that any of the four bits is set, the four-bit number is encoded into a two-bit flag in task T172 and the value is compressed by selecting its LVS as the offset value. If any of the input values fails this test (i.e. none of the four bits is set), the method terminates in task T210 and the block is not compressed.

Figure 19:
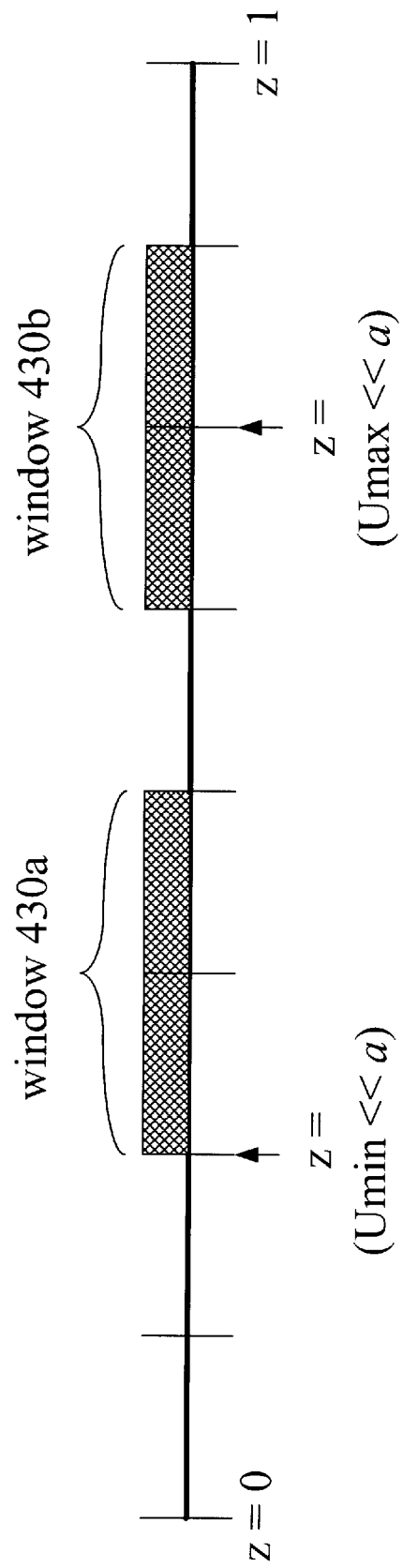
FIG. 19 shows a linear representation of the Z-axis shown in FIG. 9 with double fixed windows as associated with a method as shown in FIG. 18.

As shown in FIG. 19, one may view the operation of a method as shown in FIG. 18 as applying 'double fixed windows.' Like windows 420a and 420b as shown in FIG. 15, the lower bounds of the windows 430a and 430b will always be multiples of 2a. In this case, however, windows 430a and 430b each have widths of 2(a+1)−1, while windows 420a and 420b each have widths of only 2a−1. Therefore, in contrast to a method as shown in FIG. 14A, this method will compress even more cases than a method as shown in FIG. 8.

Figure 19A:
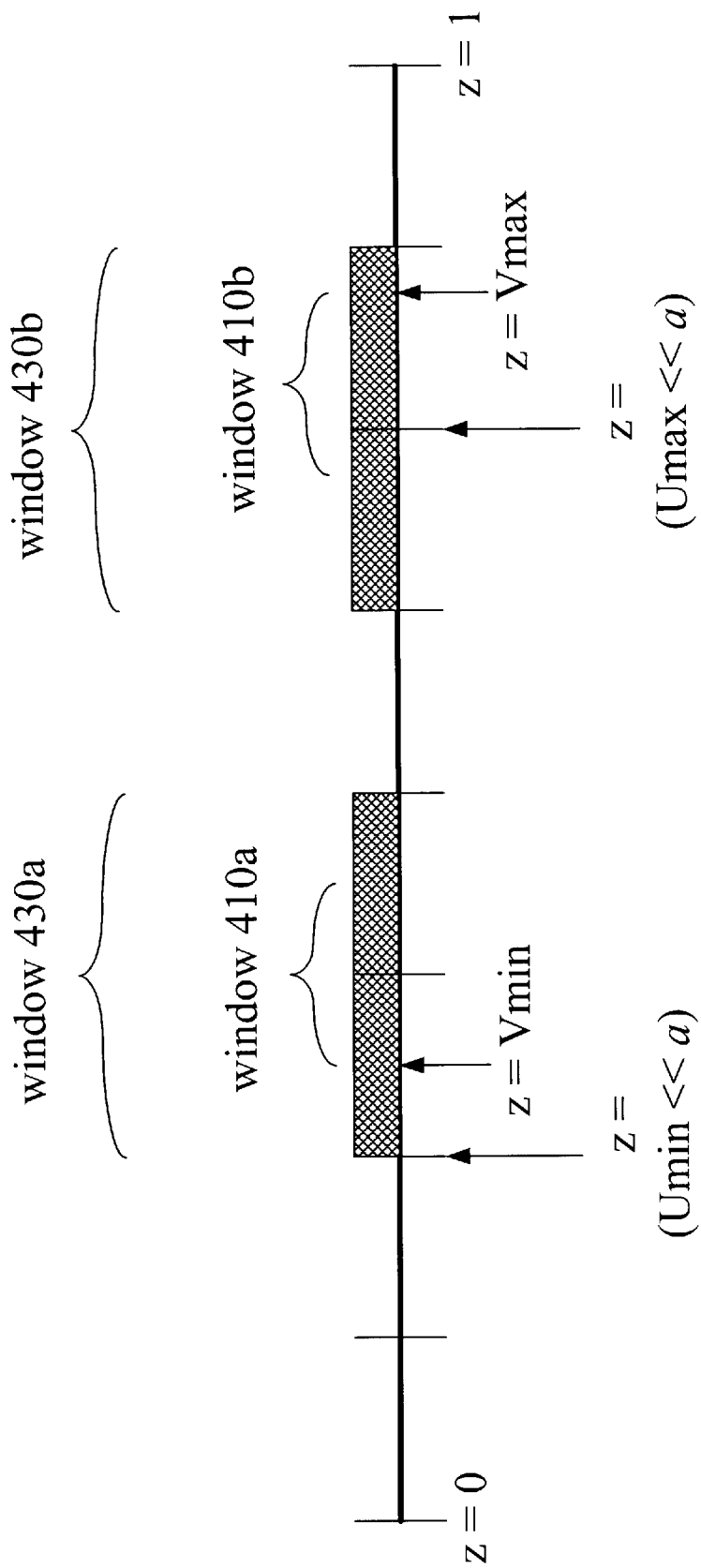
FIG. 19A shows another linear representation of the Z-axis shown in FIG. 9 with double fixed windows as associated with a method as shown in FIG. 18 and with sliding windows as associated with a method as shown in FIG. 8.

FIG. 19A demonstrates how the compression coverage of a method as shown in FIG. 18 exceeds that of a method as shown in FIG. 8. The actual minimum and maximum input values in the block are indicated as Vmin and Vmax, and windows 410a and 410b as would be applied by a method as shown in FIG. 8 are also indicated. One may recognize that any area of window 430a that lies below Vmin (as well as any area of window 430b that lies above Vmax) will not include any input values. However, window 430a also extends beyond the backmost bound of window 410a, while window 430b extends beyond the frontmost bound of window 410b, to include regions that are compressible under this method but would not be compressible under a method as shown in FIG. 8.

Figure 20:
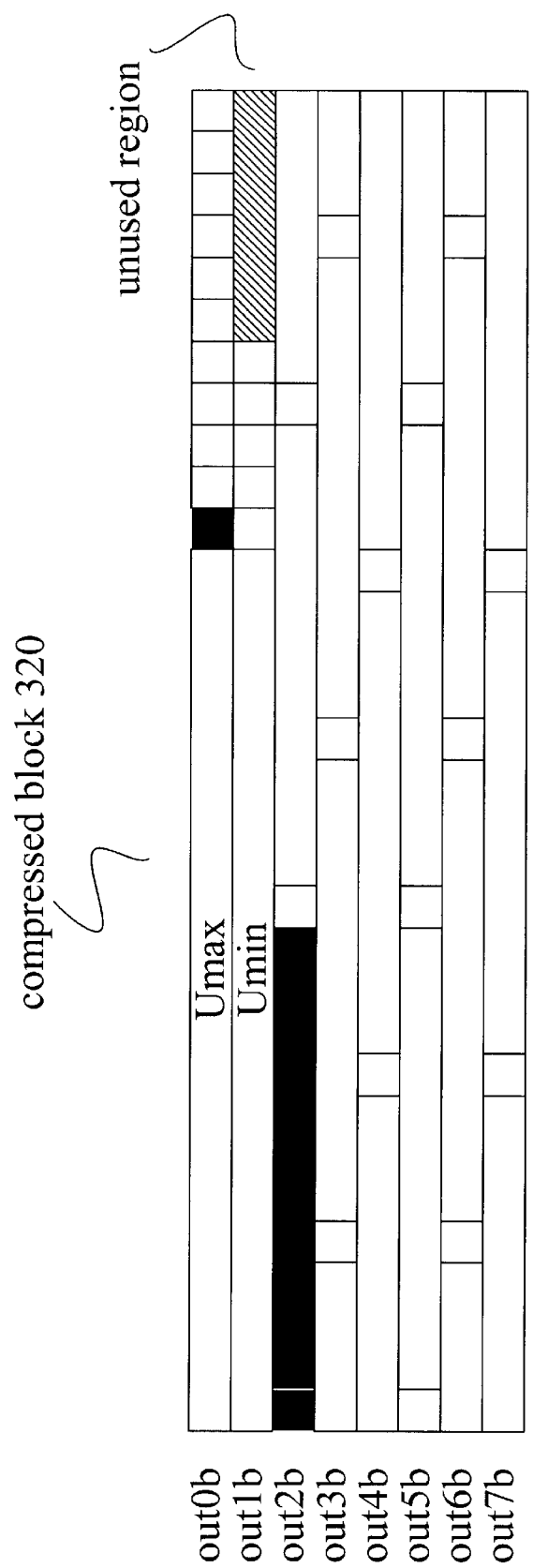
FIG. 20 shows a block of data compressed according to a method as shown in FIG. 18.

FIG. 20 depicts a compressed block 320 as may be outputted by task T236, where H=32 and a=11. In this example, each of the 32-bit output values out0b–out7b is labeled. Compressed block 320 includes the (H−a)-bit (or 21-bit) values Umin and Umax. Because the auxiliary reference values A and B are obtained from Umin and Umax in a predetermined manner, it is not necessary to include them within compressed block 320.

Each of the 16 compressed values in compressed block 320 includes an a-bit (or 11-bit) offset value that is the LVS of one of the Z values of the input block and a two-bit flag that indicates which of the four reference values is to be used as the UVS of the uncompressed value. In this example, decoding logic is simplified by storing the two bits of each flag in separate locations: one is stored next to the corresponding offset value while the other is stored in output value out0b or out1b. The shaded blocks indicate the offset value and flag of compressed value CV0b. Under this method, a transfer rate increase of over 100 percent is achieved, as compressed block 320 includes a 6-bit unused region (shown as the hatched region in FIG. 20). Therefore, a method as shown in FIG. 18 may be used to obtain greater compressibility and a higher transfer rate than a method as shown in FIG. 8, and greater compressibility at a lesser transfer rate than a method as shown in FIG. 14A. Because its range of compressibility includes more value distribution instances than either a method as shown in FIG. 8 or a method as shown in FIG. 14A, a method as shown in FIG. 18 has a higher probability of being able to compress an arbitrary value block (e.g. an arbitrary Z block) of a given size and dimension.

Figure 21:
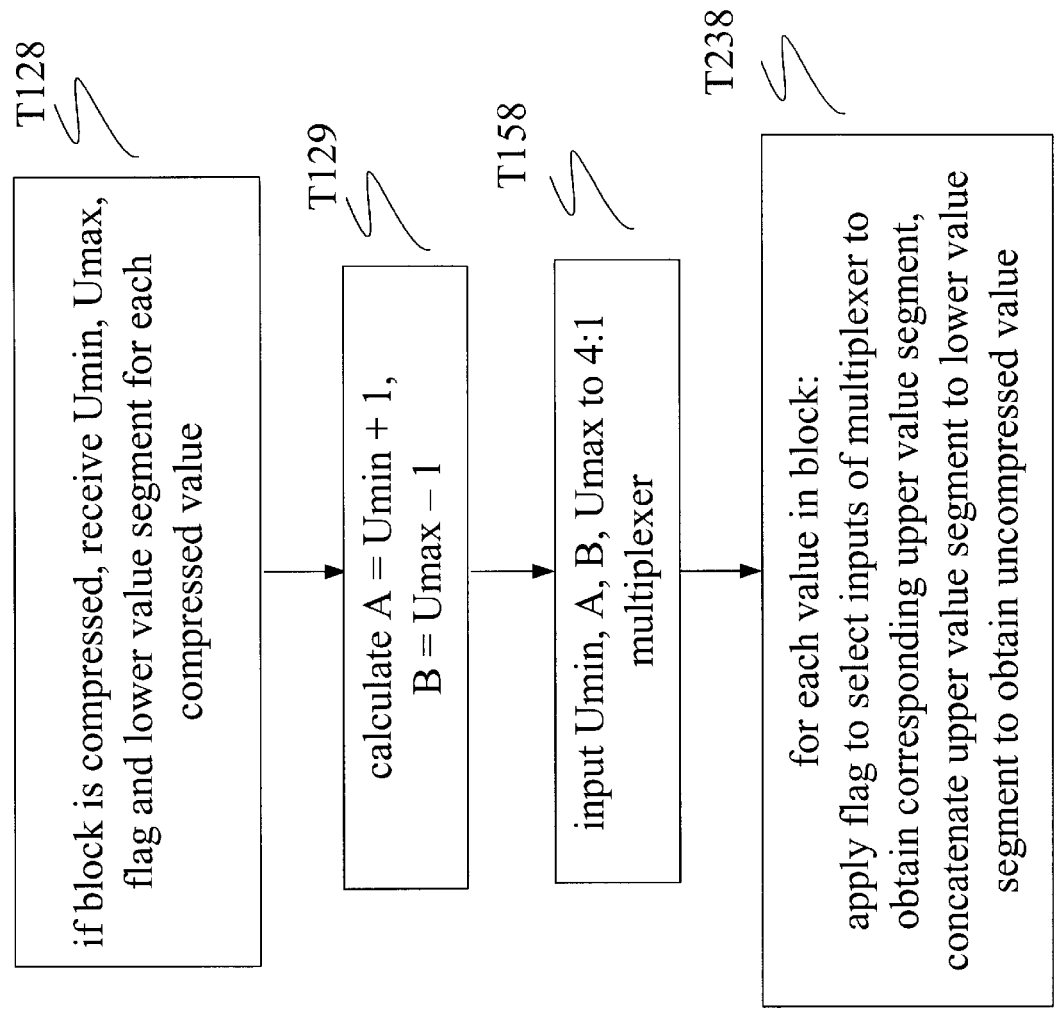
FIG. 21 shows a flow chart for a method of data decompression according to an embodiment of the invention.

FIG. 21 shows a flow chart for a method of decompressing a compressed block according to an embodiment of the invention. If the block is compressed (e.g. as indicated by mask memory 100), task T128 receives Umin and Umax, together with a two-bit flag and a LVS for each compressed value. Task T129 calculates A and B from Umin and Umax, respectively, and task T158 sets these four reference values as data input to a 4:1 multiplexer. For each compressed value in the block, task T238 applies the two-bit flag to the select inputs of the multiplexer to obtain the corresponding UVS, which is then concatenated to the offset value (i.e. the LVS) to obtain the uncompressed value.

A method for data compression as described herein may greatly reduce the bandwidth requirements for transferring input values (for example, for transferring Z values to and/or from storage). Application of such a method may also reduce the amount of memory space required to store the values of a compressible block.

Figure 22:
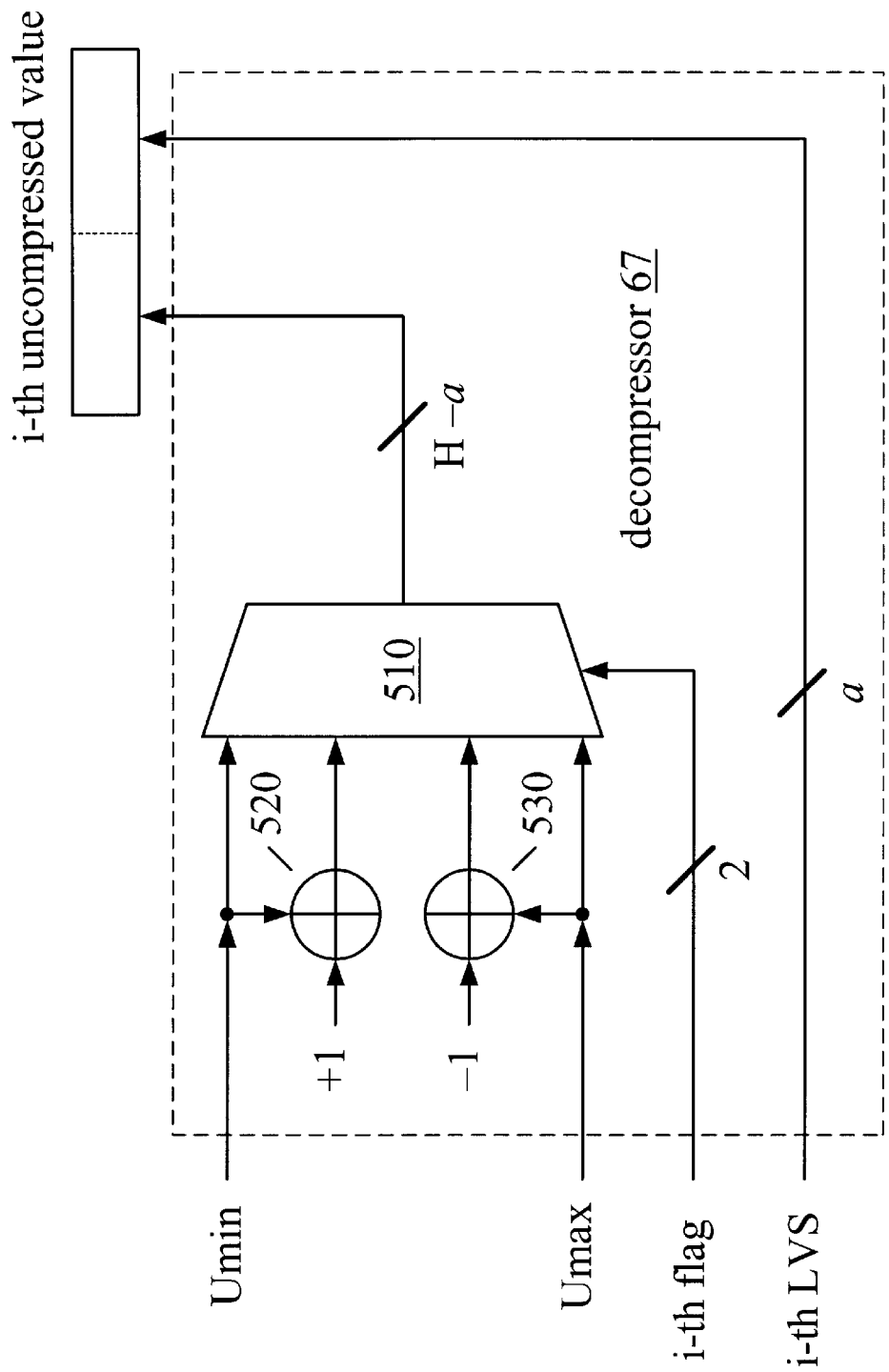
FIG. 22 shows a block diagram for a decompressor according to an embodiment of the invention.

FIG. 22 shows a block diagram of a decompressor 67 according to an embodiment of the invention. Adder 520 receives Umin and the constant value +1 and outputs the value A=Umin+1. Adder 530 receives Umax and the constant value −1 and outputs the value B=Umax−1. Multiplexer 510 receives the values Umin, A, B, and Umax at its data inputs and the i-th flag at its select input. According to the value of the i-th flag, multiplexer 510 outputs one among the values Umin, A, B, and Umax. The outputted value (i.e. the UVS of the i-th uncompressed value) is concatenated to the i-th LVS to obtain the i-th uncompressed value. In another implementation, such a decompressor also includes an input FIFO buffer to store the flags and LVSs of a block for decompression and/or an output FIFO buffer to store the uncompressed values of a block as they are decompressed.

The foregoing presentation of the described embodiments is provided to enable any person skilled in the art to make or use the present invention. Various modifications to these embodiments are possible, and the generic principles presented herein may be applied to other embodiments as well. For example, an embodiment of the invention may be implemented in part or in whole as a hard-wired circuit or as a circuit configuration fabricated into a video graphics integrated circuit or field-programmable gate array. Likewise, an embodiment of the invention may be implemented in part or in whole as a firmware program loaded or fabricated into non-volatile storage (such as read-only memory or flash memory) as machine-readable code, such code being instructions executable by an array of logic elements such as a microprocessor or other digital signal processing unit. Further, an embodiment of the invention may be implemented in part or in whole as a software program loaded as machine-readable code from or into a data storage medium such as a magnetic, optical, magnetooptical, or phase-change disk or disk drive; a semiconductor memory; or a printed bar code.

In some embodiments, execution of decision blocks and/or computation of offset values may occur in parallel for all reference values. Moreover, tasks of a method as shown in FIGS. 8, 14A, or 18 may be performed in parallel for all the input values of a block.

Additionally, an embodiment of the invention may be applied to the transfer of graphics information in other contexts as well, such as in opacity, color, or stencil processing or in other uses of Z values not specifically described herein. Thus, the present invention is not intended to be limited to the embodiments shown above but rather is to be accorded the widest scope consistent with the principles and novel features disclosed in any fashion herein.

What is claimed is:

1. A method for data compression, said method comprising:
   receiving a block of input values;
   obtaining n reference values from the block, where n is an integer greater than zero;
   obtaining n sets of offset values, each set of offset values corresponding to one among the n reference values; and
   transmitting a compressed block comprising the n sets of offset values,
   wherein each offset value corresponds to one among the input values and indicates a distance between the corresponding reference value and the corresponding input value.

2. The method according to claim 1, wherein obtaining n reference values from the block includes at least one among
   (a) determining which among the input values indicates a position closest to a display plane, and
   (b) determining which among the input values indicates a position farthest from a display plane.

3. The method according to claim 1, wherein at least one of said offset values indicates a spatial distance with respect to a display plane.

4. The method according to claim 1, said method further comprising performing an occlusion test on a fragment,
   wherein said performing an occlusion test comprises comparing a Z value of the fragment to at least one among the block of input values.

5. The method according to claim 1, wherein each offset value is represented in fewer bits than the corresponding input value.

6. The method according to claim 1, wherein the compressed block further comprises at least a portion of at least one of the n reference values.

7. The method according to claim 1, wherein the n reference values include a minimum among the input values.

8. The method according to claim 7, wherein the n reference values include a maximum among the input values.

9. The method according to claim 1, wherein the n reference values include a maximum among the input values.

10. The method according to claim 1, wherein each among the input values comprises an upper value segment and a lower value segment, and
    wherein the n reference values include a minimum among the upper value segments.

11. The method according to claim 1, wherein each among the input values comprises an upper value segment and a lower value segment, and
    wherein at least some of the offset values comprise the lower value segments of the corresponding input values.

12. The method according to claim 1, wherein the compressed block includes a plurality of flags, and
    wherein each flag indicates an association between an offset value and the corresponding reference value.

13. The method according to claim 1, said method further comprising determining that none of the offsets indicated by the offset values is greater than a predetermined threshold.

14. The method according to claim 1, wherein each offset value is at least derived from a difference between (A) a number at least derived from the corresponding reference value and (B) the corresponding input value.

15. The method according to claim 1, wherein at least one of the n reference values is derived from another of the n reference values.

16. The method according to claim 15, wherein obtaining n reference values from the block includes at least one among
    (a) determining which among the input values indicates a position closest to a display plane, and
    (b) determining which among the input values indicates a position farthest from a display plane.

17. The method according to claim 15, said method further comprising performing an occlusion test on a fragment,
    wherein said performing an occlusion test comprises comparing a Z value of the fragment to at least one among the block of input values.

18. A method of data compression, said method comprising:
    receiving a block comprising a maximum value, a minimum value, a plurality of high values each having a value within a first threshold of the maximum value, and a plurality of low values each having a value within a second threshold of the minimum value;
    obtaining a first reference value based on at least an upper value segment of the maximum value and a second reference value based on at least an upper value segment of the minimum value;
    calculating a plurality of high offsets, each indicating a distance between a corresponding one of the high values and a value at least derived from the first reference value;
    calculating a plurality of low offsets, each indicating a distance between a corresponding one of the low values and a value at least derived from the second reference value; and
    transmitting a compressed block comprising at least the upper value segment of the maximum value, at least the upper value segment of the minimum value, the plurality of high offsets, and the plurality of low offsets.

19. The method according to claim 18, wherein said obtaining a first reference value and a second reference value comprises obtaining a first reference value based on an upper value segment of the maximum value and a second reference value based on an upper value segment of the minimum value.

20. The method according to claim 19, said method further comprising:
    obtaining a third reference value based on one among the first reference value and the second reference value; and
    calculating a plurality of third offsets, each indicating a distance between (A) a corresponding one among the high values and the low values and (B) a value at least derived from the third reference value.

21. The method according to claim 18, said method further comprising:
    obtaining a third reference value based on one among the first reference value and the second reference value; and
    calculating a plurality of third offsets, each indicating a distance between (A) a corresponding one among the high values and the low values and (B) a value at least derived from the third reference value.

22. The method according to claim 18, wherein the compressed block further comprises a plurality of flags, and
    wherein each among the plurality of flags corresponds to one among the plurality of offset values, and
    wherein each among the plurality of flags indicates one among the reference value and the second reference value.

23. A circuit for data transfer, comprising:

a cache configured and arranged to store values; and a compressor coupled to the cache and configured and arranged to receive a block of values from the cache and to transmit a compressed block based at least in part on the block of values;

wherein the block of values comprises a maximum value, a minimum value, a plurality of high values each having a value within a first threshold of the maximum value, and a plurality of low values each having a value within a second threshold of the minimum value;

wherein the compressor obtains a first reference value based on at least an upper value segment of the maximum value and a second reference value based on at least an upper value segment of the minimum value, and wherein the compressor calculates a plurality of high offsets, each indicating a distance between a corresponding one of the high values and a value at least derived from the first reference value, and wherein the compressor calculates a plurality of low offsets, each indicating a distance between a corresponding one of the low values and a value at least derived from the second reference value, and wherein the compressed block comprises at least the upper value segment of the maximum value, at least the upper value segment of the minimum value, the plurality of high offsets, and the plurality of low offsets.

24. The circuit according to claim 23, wherein said cache is further configured and arranged to transmit the block of values according to a predetermined cache replacement policy.

25. A data storage medium having machine-readable code stored thereon, the machine-readable code comprising instructions executable by an array of logic elements, the instructions defining a method for data compression, said method comprising:

receiving a block comprising a maximum value, a minimum value, a plurality of high values each having a value within a first threshold of the maximum value, and a plurality of low values each having a value within a second threshold of the minimum value;

obtaining a first reference value based on at least an upper value segment of the maximum value and a second reference value based on at least an upper value segment of the minimum value;

calculating a plurality of high offsets, each indicating a distance between a corresponding one of the high values and a value at least derived from the first reference value;

calculating a plurality of low offsets, each indicating a distance between a corresponding one of the low values and a value at least derived from the second reference value; and transmitting a compressed block comprising at least the upper value segment of the maximum value, at least the upper value segment of the minimum value, the plurality of high offsets, and the plurality of low offsets.

26. The data storage medium according to claim 25, said method further comprising:

obtaining a third reference value based on one among the first reference value and the second reference value; and calculating a plurality of third offsets, each indicating a distance between (A) a corresponding one among the high values and the low values and (B) a value at least derived from the third reference value.

27. A circuit for processing a data set including a minimum reference value, a maximum reference value, and a plurality of flags, said circuit comprising:

a first adder configured and arranged to receive the minimum reference value and a first constant value and to output a first auxiliary reference value;

a second adder configured and arranged to receive the maximum reference value and a second constant value and to output a second auxiliary reference value; and a multiplexer configured and arranged to receive at its data inputs the minimum reference value, the maximum reference value, the first auxiliary reference value, and the second auxiliary reference value, to receive at its select input a flag associated with a lower value segment of a data value, and to output, according to the value of the flag, an upper value segment of the data value.

28. The circuit according to claim 27, said circuit further comprising a storage element coupled to said multiplexer and configured and arranged to store a value based on a concatenation of at least the upper value segment of the data value and the lower data segment of the data value.

29. A data storage medium having machine-readable code stored thereon, the machine-readable code comprising instructions executable by an array of logic elements, the instructions defining a method for data compression, said method comprising:

receiving a block of input values;

obtaining n reference values from the block, where n is an integer greater than zero;

obtaining n sets of offset values, each set of offset values corresponding to one among the n reference values; and transmitting a compressed block comprising the n sets of offset values, wherein each offset value corresponds to one among the input values and indicates a distance between the corresponding reference value and the corresponding input value, and wherein at least one of the n reference values is derived from another of the n reference values.

30. The medium according to claim 29, said method further comprising storing the compressed block to a predetermined storage area of a buffer, wherein said receiving a block of input values comprises receiving a block of values based at least in part on values stored in the predetermined storage area of the buffer.

* * * * *